(12) United States Patent
Inaoka et al.

(10) Patent No.: US 6,351,550 B1
(45) Date of Patent: Feb. 26, 2002

(54) SEAL IMPRINT VERIFYING APPARATUS

(75) Inventors: Hideyuki Inaoka; Satoshi Kataoka; Eiichi Watanabe; Yutaka Katsumata, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/047,362

(22) Filed: Mar. 24, 1998

(30) Foreign Application Priority Data

Sep. 17, 1997 (JP) .............................................. 9-251919

(51) Int. Cl.⁷ ................................................. G06K 9/00
(52) U.S. Cl. ...................................... 382/135; 382/100
(58) Field of Search ................................. 382/135, 100; 209/534; 335/379; 250/200; 356/71; 902/7

(56) References Cited

U.S. PATENT DOCUMENTS

| | | | |
|---|---|---|---|
| 5,159,646 A | * 10/1992 | Kumagai | 382/34 |
| 5,164,997 A | * 11/1992 | Ryohei | 382/46 |
| 5,367,580 A | * 11/1994 | Kumagai | 382/46 |
| 5,379,093 A | * 1/1995 | Hashimoto et al. | 399/366 |
| 5,450,291 A | * 9/1995 | Kumagai | 362/3 |
| 5,490,225 A | * 2/1996 | Kumagai | 382/227 |
| 5,553,196 A | * 9/1996 | Takatori | 395/24 |
| 5,960,112 A | * 9/1999 | Lin | 382/218 |

FOREIGN PATENT DOCUMENTS

JP          6-309439          11/1994     ........... G06F/15/82

* cited by examiner

*Primary Examiner*—Leo Boudreau
*Assistant Examiner*—M. B. Choobin
(74) *Attorney, Agent, or Firm*—Staas & Halsey LLP

(57) ABSTRACT

A seal imprint verifying apparatus for conducting verifying work of a seal imprint more properly than in the past is provided. When an image data of the seal imprint surface of a bill, etc. is acquired by an image reader, a CPU extracts only the image data of the color of the seal imprint out of the image data of the seal imprint surface and takes out the image data of a target seal imprint out of the extraction result. The CPU thereafter compares the image data of the reference seal imprint and the image data of the target seal imprint and thereby determines whether or not both image data agree with each other.

23 Claims, 22 Drawing Sheets

FIG. 10
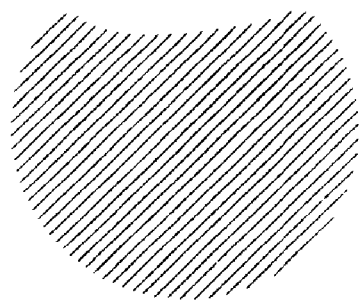
(c)
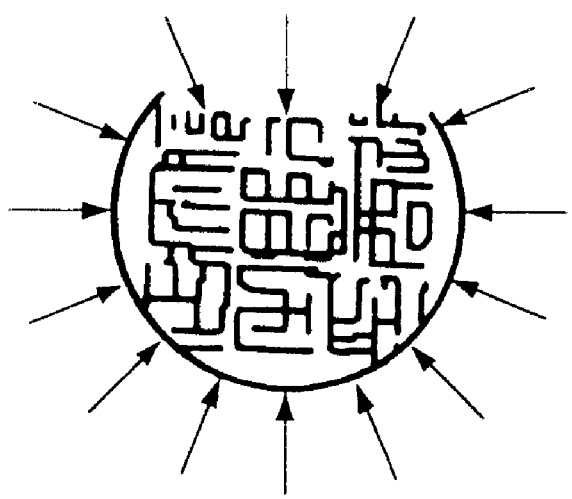
(b)
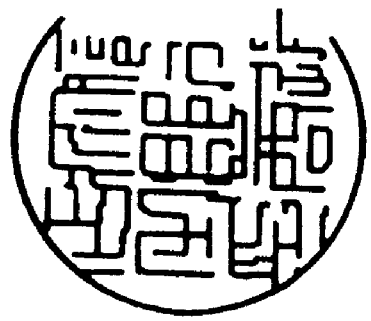
(a)

FIG. 13
(a) 
(b) 

FIG. 14
(a)
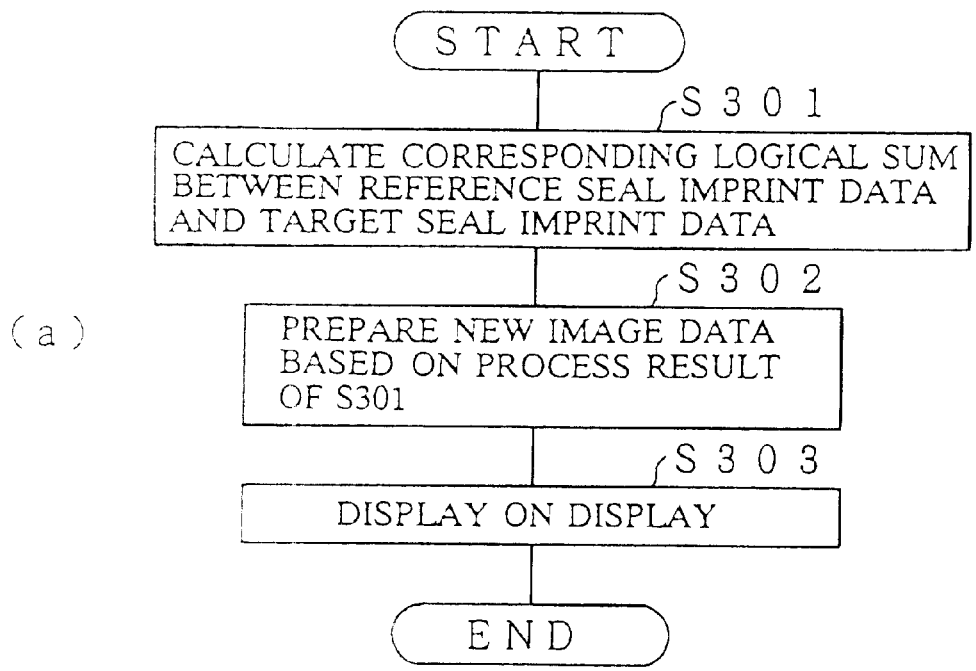
(b)
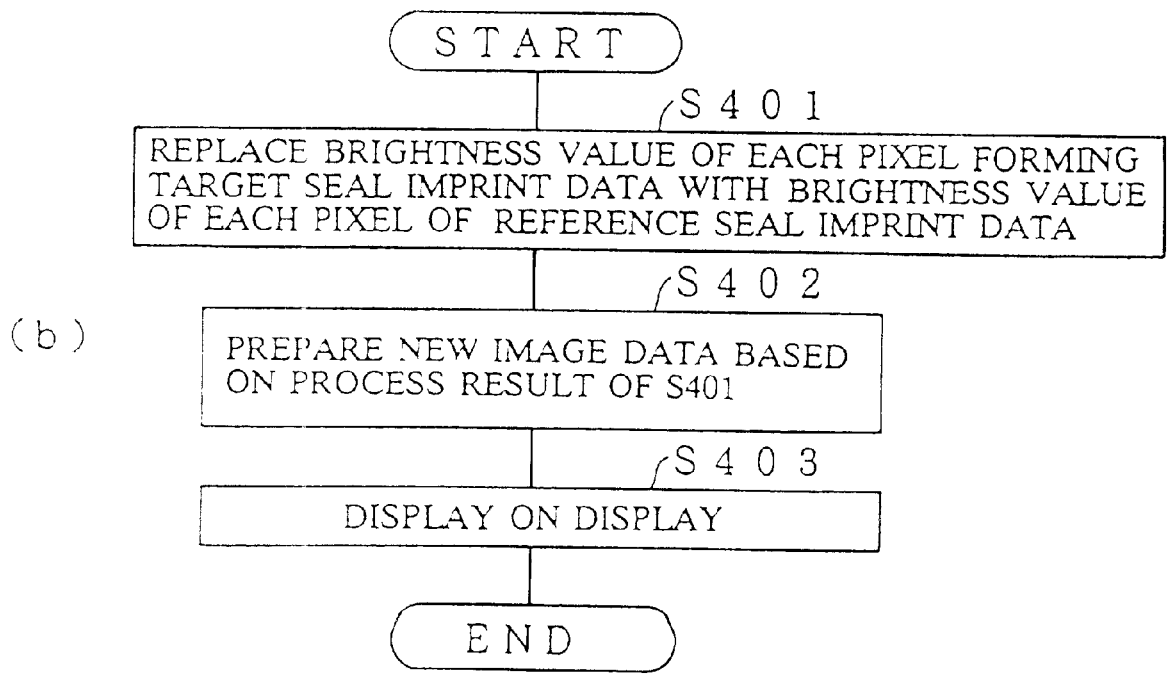

FIG. 15

FIG. 16
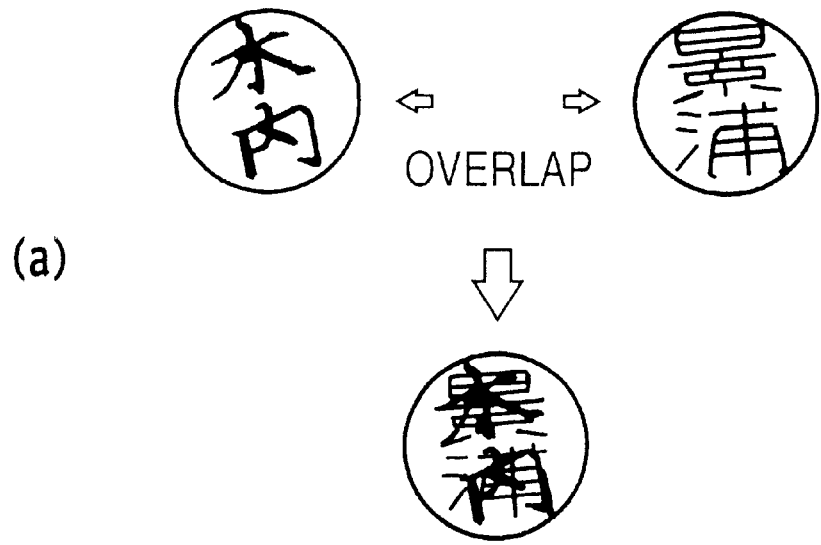
(a)
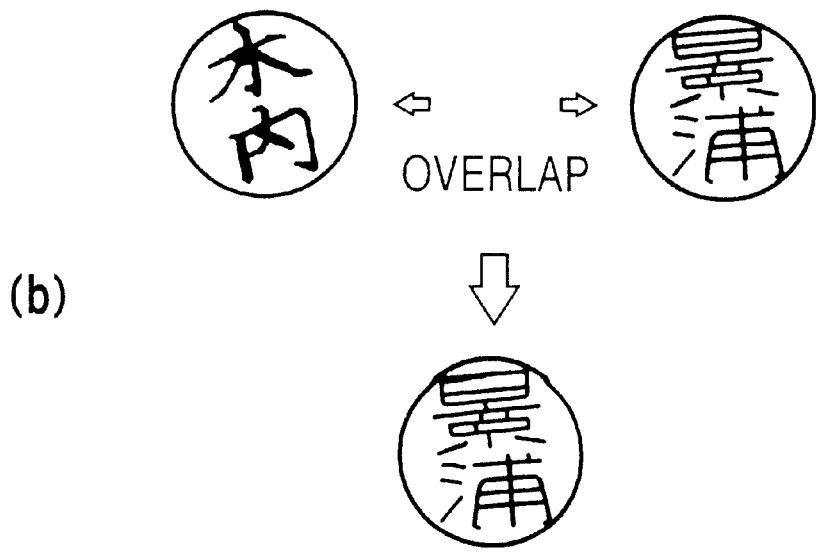
(b)

(a) TARGET OVERALL IMAGE

REFERENCE SEAL IMPRINT (b) TRANSPARENT OVERLAP REFERENCE SEAL IMPRINT ON TARGET IMAGE (c) DISPLAY TARGET | DISPLAY OVERLAP
t1 — t2
◄── ONE CYCLE ──►

FIG. 20
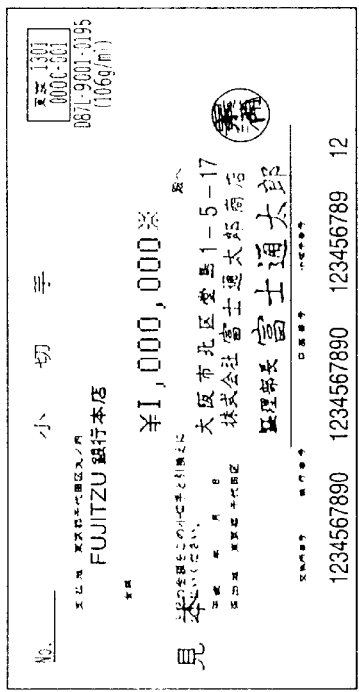
(b) NON-TRANSPARENT OVERLAP REFERENCE SEAL IMPRINT ON TARGET IMAGE
OVERLAP
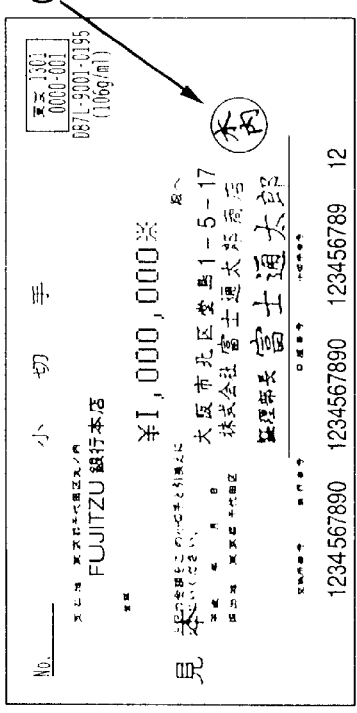
(a) TARGET OVERALL IMAGE
(c)
| DISPLAY REFERENCE | DISPLAY BLANK PATTERN | DISPLAY TARGET | DISPLAY BLANK PATTERN |
|---|---|---|---|
| t1 | t2 | t3 | t4 |
←——————— ONE CYCLE ———————→
t1, t2, t3, t4 ⇒ CAN BE SET AS VARIABLE

FIG. 22
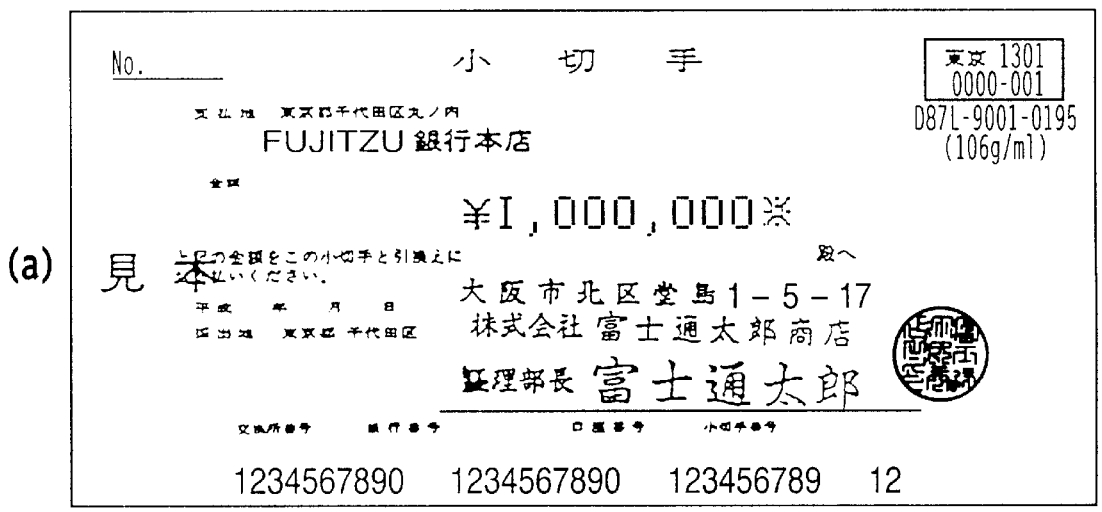
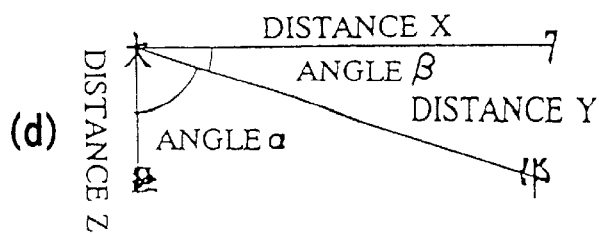

SEAL IMPRINT VERIFYING APPARATUS

BACKGROUND OF THE INVENTION

1. Field of the Invention

The present invention relates to a seal imprint verifying apparatus for verifying a target seal imprint such as a representative's seal or signature seal stamped on marketable securities such as bills or checks by collating the target seal imprint with registered reference seal imprints.

2. Description of the Related Art

In recent years, financial institutions such as banks have constructed on host computers data bases in which information regarding customers are stored and have formed networks by connecting the host computers to terminal apparatuses placed at window counters using communication lines.

When a customer brings a bill or a check to a window counter, an operator conducts the following verifying work for determining if a representative's seal or a signature seal stamped on the bill or the check is the appropriate one.

That is, the operator uses a terminal apparatus placed at the window counter with, for example, an account number as a retrieval key to retrieve an image data of a reference seal imprint of the corresponding representative's seal or signature seal from a data base. If a corresponding image data has been already registered, the image of an seal imprint based on the image data is then displayed on the display of the terminal apparatus.

A CRT (cathode ray-tube) or an LCD (liquid crystal display) with high resolution is used as the display of a terminal apparatus to display the image of an seal imprint is displayed in its life-size. The operator then determines if the stamped seal imprint is the appropriate one by verifying the reference seal imprint displayed on the display and a target seal imprint stamped on the real bill or check.

However, the above-mentioned verifying work takes a long period of time because almost the entire work depends on the operator. In addition, occurrences of careless mistakes have been inevitable as long as the verifying work is conducted manually.

Although it is obvious that the efficiency of the verifying work increases if the above-mentioned verifying work is automated using computers and various proposals have been made in the past, any of the proposals had low accuracy of verification and has not been made practicable. The following three major problems has been preventing the practical use of an automated verification:

A first problem is that it is difficult to extract only the portion of an imprint from the image of an object such as a bill.

A second problem is the existence of a partial seal imprint. Since it is impossible for a person to always stamp a seal under a regular condition, a partial seal imprint is formed with a part of a seal imprint lacking in some cases. When the partial seal imprint is collated as a target seal imprint with a complete reference seal imprint, the verification results disagreement even if both seal imprints are derived from the identical seal.

A third problem is the existence of an external frame on a seal imprint. In general, a seal imprint is provided with a square or a circle external frame surrounding a letter portion in the center, and if an external frame of a target seal imprint and that of a reference seal imprint are similar, the agreement of the external frame is overemphasized at a verification, which tends to make a slight difference of the letter portion inside overlooked.

SUMMARY OF THE INVENTION

The present invention has been made in view of the above described circumstances, and therefore, a first object of the present invention is to solve the above-mentioned first problem and to provide a seal imprint verifying apparatus which can extract only a portion of a target seal imprint from the image of an object such as a bill and verify it with a reference seal imprint.

A second object of the present invention is to solve the above-mentioned second problem and to provide a seal imprint verifying apparatus which can collate a target seal imprint with a reference seal imprint with high accuracy even if a seal imprint is partially stamped on a bill, etc.

A third object of the present invention is to solve the above-mentioned third problem and to provide a seal imprint verifying apparatus which can collate a letter portion inside a seal imprint accurately irrespective of the similarity of an external frame even in case of a seal imprint small in size.

A first aspect of the present invention is characterized in that a target seal imprint being a seal imprint stamped on an object to be sealed is identified by its color and size and extracted in order to attain the above-mentioned first object of the present invention.

That is, according to the first aspect of the present invention, a seal print verifying apparatus for verifying a target seal imprint stamped on an object is characterized by comprising: an image data capturing means for capturing image data of a target surface on which the target seal imprint is stamped; a color information extracting means for extracting image data having the color of the target seal imprint from the image data of the target surface; a size information extracting means for extracting image data recognized as having the size equivalent to that of the reference seal imprint out of the image data extracted by the color information extracting means; and a determining means for comparing the image data of the reference seal imprint and the image data of the target seal imprint extracted by the size information extracting means to determine whether the target seal imprint does agree with the reference seal imprint.

According to the above construction, when the image data capturing means captures image data of the target surface, the color information extracting means extracts only the image data having the same color as the seal imprint out of the image data of the target surface. The size information extracting means subsequently extracts image data of the target seal imprint out of the results of extraction by the color information extracting means and thereafter can determine whether the target seal imprint agrees with the reference seal imprint by comparing image data.

An object to be sealed is for example a marketable security such as a bill or a check. In addition, an image data capturing means may be an image reader (image scanner). Further, a color information extracting means and a size information extracting means may be the function of a computer program.

The above-mentioned determining means is preferably constructed so as to detect the degree of difference for the plurality of times by changing the direction of either one of the image data of the reference seal imprint or the image data of the target seal imprint. If the minimum value of the acquired plurality of degrees of difference is within the predetermined threshold value, the determining means determines that the target seal imprint agrees with the reference seal imprint.

A second aspect of the present invention is characterized in that a mask is formed to be equivalent to the external shape of a target partial seal imprint stamped on an object and an image formed by the logical product of the mask and the image data of the reference seal imprint are compared and collated with the target seal imprint in order to attain the above-mentioned second object of the present invention.

That is, according to the second aspect of the present invention, a seal imprint verifying apparatus is characterized by comprising: an image data capturing means for capturing image data of the target surface on which the target seal imprint is stamped; a target specifying means for extracting image data of the target seal imprint out of the image data of the target surface; a mask image preparing means for preparing mask image data representing the external shape of the image data of the target seal imprint; an image data composing means for calculating the logical product of the image data of the reference seal imprint and the mask image data to prepare composed reference image data; and a determining means for comparing the composed reference image data and the image data of the target seal imprint to determine whether the target seal imprint agrees with the reference seal imprint.

According to the above-mentioned structure, the image data composing means prepares the composed reference image data being the image data of the reference seal imprint having the external shape of the target seal imprint. Therefore, even if the target seal imprint is in such a condition that a part of the seal imprint is cut out due to partial seal, the system can determine that both seal imprints agree with each other when the both seal imprints are formed by the identical seal.

The above-mentioned determining means is preferably constructed so as to detect the degree of difference for the plurality of times by changing the direction of letters of either one of the image data of the composed reference seal imprint or the image data of the target seal imprint. If the minimum value of the acquired plurality of degrees of difference is within the predetermined threshold value, the determining means determines that the target seal imprint agrees with the reference seal imprint.

If the determining means then changes the direction of letters of the composed reference image data to detect the degree of difference, the image data composing means preferably changes the direction of letters of the reference seal imprint each time the direction is changed by the determining means to prepare the composed reference image data.

A third aspect of the preset invention is characterized in that the external frames of a target seal imprint and a reference seal imprint are removed before comparing both seal imprints in order to attain the above-mentioned third object.

That is, according to the third aspect of the present invention, a seal imprint verifying apparatus is characterized by comprising: an image data capturing means for capturing image data of the target surface on which the target seal imprint is stamped; a target specifying means for extracting image data of the target seal imprint out of the image data of the target surface; an external frame removing means for preparing image data of the target seal imprint of which external frame portion is removed therefrom, and preparing image data of the reference seal imprint of which external frame portion is removed therefrom; and a determining means for comparing the reference seal imprint and the target seal imprint after the external frame portions are removed by the external frame removing means to determine if both seal imprints agree with each other.

According to the above-mentioned construction, image data of the target seal imprint and the reference seal imprint of which external frame portions are removed therefrom are prepared. Then, since these images are compared, the accuracy of the result of determining agreement or disagreement of both image data is improved over the case in which the reference seal imprint and the target seal imprint are simply compared.

Further, before the process by the external frame removing means, it is possible to determine by an external diameter determining means whether the external diameter of the target seal imprint agrees with the external diameter of the reference seal imprint and to determine by an external shape determining means whether the external shape of the target seal imprint agrees with the external shape of the reference seal imprint. In this case, the external frame removing means may be made as preparing an image data excluding the external frame of the seal imprint only when the outside diameters and the external shapes are recognized as agreeing with each other by the outside diameter determining means and the external shape determining means, respectively.

Incidentally, even in case that the process as described above is gone through, agreement/disagreement cannot be determined in some cases. In such a case, determination is eventually made by an operator. A fourth aspect of the present invention is aimed to provide an apparatus capable of conducting verification easier than before by supporting verifying work when an operator conducts verification.

According to the fourth aspect of the present invention, a seal imprint verifying apparatus for displaying on a display apparatus a target seal imprint stamped on an object to be sealed and a reference seal imprint registered in advance and verifying them to find if they agree with each other is characterized by comprising: an image data capturing means for capturing image data of the target surface on which the target seal imprint is stamped; a target specifying means for extracting image data of the target seal imprint out of the image data of target surface; and a display controlling means for alternatively displaying either two of an image data of the target seal imprint, an image data of the reference seal imprint or a transparent image data overlapping both seal imprints on the identical area on the display apparatus.

According to the above-mentioned construction, overlapping work of the seal imprints can be conducted inside the seal imprint verifying apparatus without using an actual object such as a bill.

The above-mentioned display controlling means displays the image data of the reference seal imprint for a first period of time and displays the transparent image data for a second period of time, thereby being capable of alternatively display these image data. In this case, the first and the second periods of time can be arbitrary set by an operator.

Further, the display controlling means displays an image data of the reference seal imprint for a first period of time, displays an image data of the target seal imprint for a third period of time after a non-displaying period for a second period of time, places a non-displaying period for a fourth period of time, thereby being capable of alternatively displaying these image data with the non-displaying period in between. In this case, the first, the second, the third and the fourth periods of time can be arranged as arbitrary set by an operator.

BRIEF DESCRIPTION OF THE DRAWINGS

The invention will be described below in detail with reference to the accompanying drawings; in which:

FIG. 10 is an explanatory illustration of a mask image preparation;

FIG. 13 is an explanatory illustration of the external frame removing process of a seal imprint;

FIG. 14 is a flow chart showing an overlapping process of seal imprints;

FIG. 15 is an explanatory illustration of the overlapping process of seal imprints;

FIG. 16 is an explanatory illustration of an overlapping process of seal imprints;

FIG. 20 is an explanatory illustration of the second seal imprint blinking process;

FIG. 22 is an explanatory illustration of the signature seal verifying process.

DETAILED DESCRIPTION OF THE PREFERRED EMBODIMENTS

Preferred embodiment of the present invention will now be described with reference to the accompanying drawings.

Figure 1:
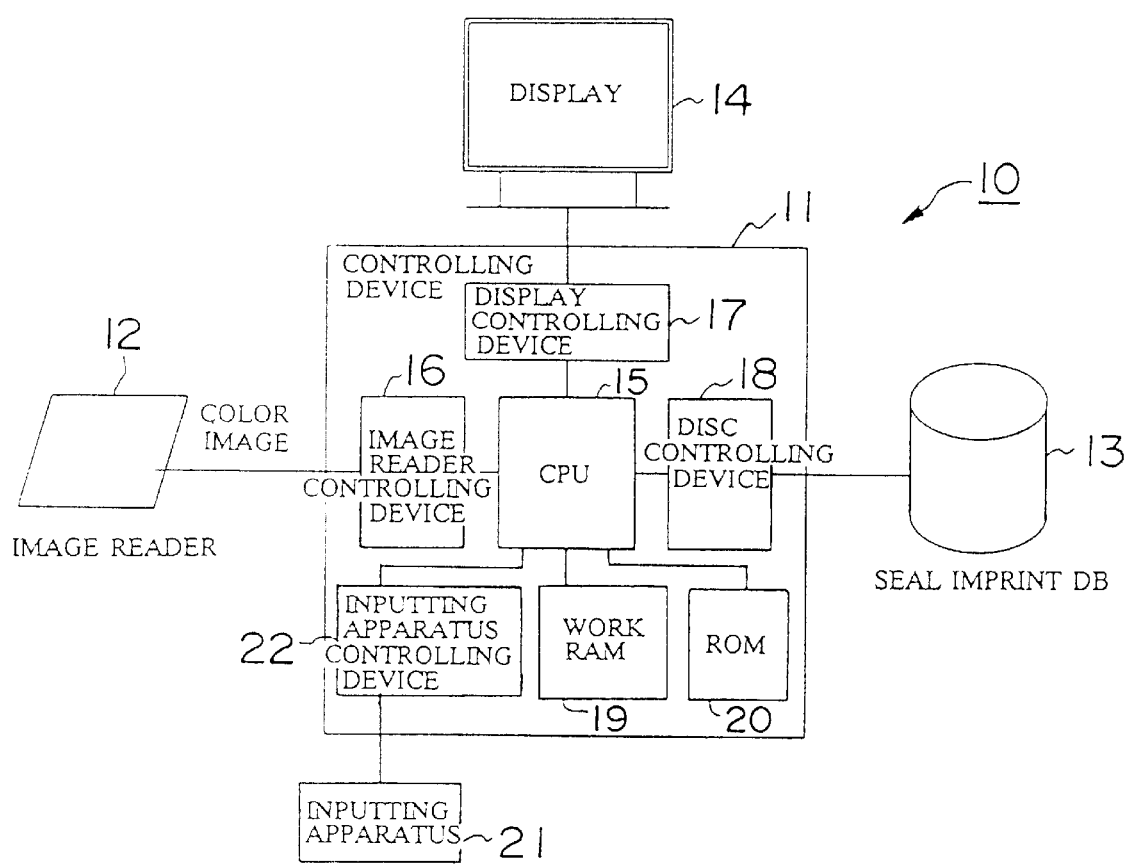
FIG. 1 is a block diagram of a seal imprint verifying apparatus according to an embodiment of the present invention.

FIG. 1 is a block diagram showing a seal imprint verifying apparatus 10 according to an embodiment of the present invention. The seal imprint verifying apparatus 10 is used for verifying work between a seal imprint (target seal imprint) such as a representative's seal or a signature seal stamped on marketable securities such as a bill or a check (hereinafter referred to as "a bill, etc." and a seal imprint (reference seal imprint) of a registered seal registered in a financial institution in advance.

In FIG. 1, the seal imprint verifying apparatus 10 comprises a controlling device 11, and an image reader 12, a seal imprint data base (hereinafter referred to as "DB") 13; a display 14 and an inputting apparatus 21 connected to the controlling device 11, respectively. The controlling device 11, the image reader 12, the display 14, and the inputting apparatus 21 are provided as terminal apparatuses at the window counter of the financial institution. The DB 13 is constructed in a host computer and is connected to the controlling device 11 via a communication line.

The DB 13 is composed using a mass storage apparatus (for example, magnetic tapes, hard discs, magnet-optical discs, etc.). Multiple numbers of image data of seal imprints of representative's seals or image data of seal imprints of signature seals, etc. registered as seals to be stamped on marketable securities are stored in the DB 13.

The controlling device 11 is a computer comprising a CPU 15, and an image reader controlling device 16, a display controlling device 17, a disc controlling device 18, a work RAM 19, and a ROM 20 connected to the CPU 15 via a bus.

Control programs for each process executed by the CPU 15 are installed in the ROM 20. The work RAM 19 is used as an execution area (work area) of the control programs executed by the CPU 15, and is used as a storing area for an image data captured by the image reader 12 and an image data read out from the DB.

The CPU 15 gives instructions to each of the image reader controlling device 16, the display controlling device 17 and the disc controlling device 18 by executing the control programs read out on the work RAM 19 from the ROM 20.

The image reader controlling device 16 gives an actuation signal to the image reader 12 corresponding to the instruction from the CPU 15. The image reader controlling device 16 gives the image data of a bill read by the image reader 12 to the CPU 15. The image data given to the CPU 15 is stored in the work RAM 19.

The display controlling device 17 receives an image data from the CPU 15 and an image display instruction. The display controlling device 17, upon receiving the image display instruction, causes the display 14 such as a CRT or a LCD to display an image based on the image data.

The disc controlling device 18 receives the retrieval key of the image data from the CPU 15 as a search instruction. The disc controlling device 18, upon receiving the search instruction, searches the DB 13, and if an image data relevant to, is found, reads out the image data to give it to the CPU 15. The image data given to the CPU 15 is stored in the work RAM 19.

An inputting apparatus controlling device 22 gives various types of signals and data inputted from the inputting apparatus 21 by an operator, to the CPU 15. The inputting apparatus 21 consists of a keyboard and a pointing device such as a mouse. The CPU 15 executes various types of process when a signal inputted from the inputting apparatus 21 via the inputting apparatus controlling devise 22, is received.

Figure 2:
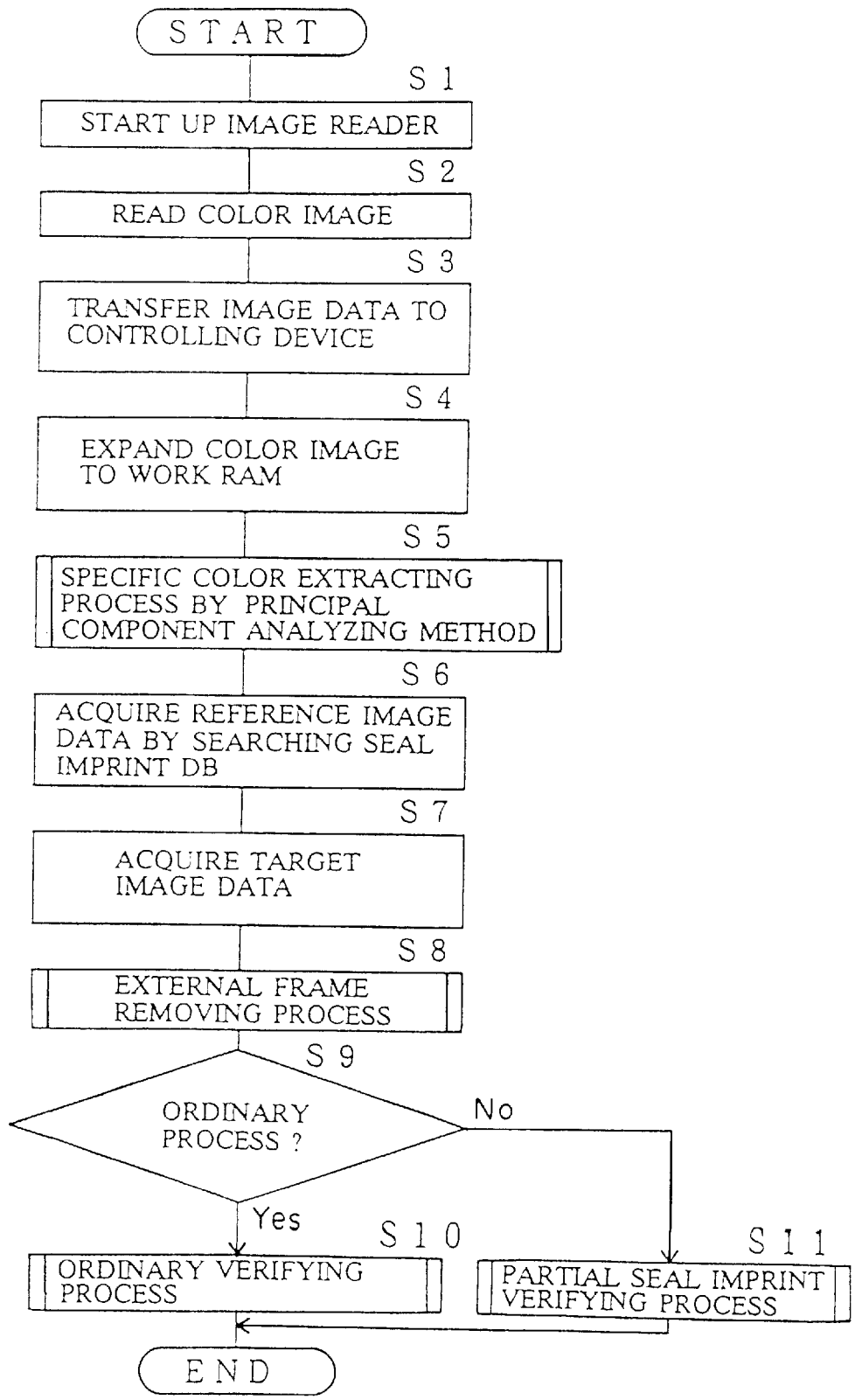
FIG. 2 is a flow chart showing a target data capturing process.

The seal imprint verifying apparatus 10 automatically collates the target seal imprint stamped on an actual object such as a bill with the reference seal imprint registered in the DB 13, and displays the result of the verification on the display 14. The automatic verifying process by the seal imprint verifying apparatus 10 is now described below with reference to a flow chart shown in FIG. 2.

[Automatic Verifying Process]

The automatic verifying process starts when an operator inputs the instruction to start verification in the controlling device 11 via the inputting apparatus 21 after setting a bill, etc. in the image reader 12.

The CPU 15, upon receiving the instruction to start verification, starts up the image reader 12 via the image reader controlling device 16 (step S1). Then the image reader 12 reads the color image of the entire surface of a bill, etc. set therein on which the seal imprint is stamped (step S2). The color image data of the entire surface of a bill, etc. (hereinafter referred to as "seal imprint surface data") is captured (equivalent to the image data capturing means).

The seal imprint surface data captured by the image reader 12 is transferred to the CPU 15 via the image reader controlling device 16 (step S3) and the CPU 15 expands the seal imprint surface data received from the image reader controlling device 16 in the work RAM 19 (step S4).

The CPU 15 subsequently executes the subroutine for the specific color extracting process by the principal component analyzing method (equivalent to the color information extracting means). The specific color extracting process is the process for extracting only pixels corresponding to the seal imprint from the seal imprint surface data and for clearing the pixel data having other color characteristics. In the embodiment, the pixel contained in the color distribution of dark red are extracted.

Figure 3:
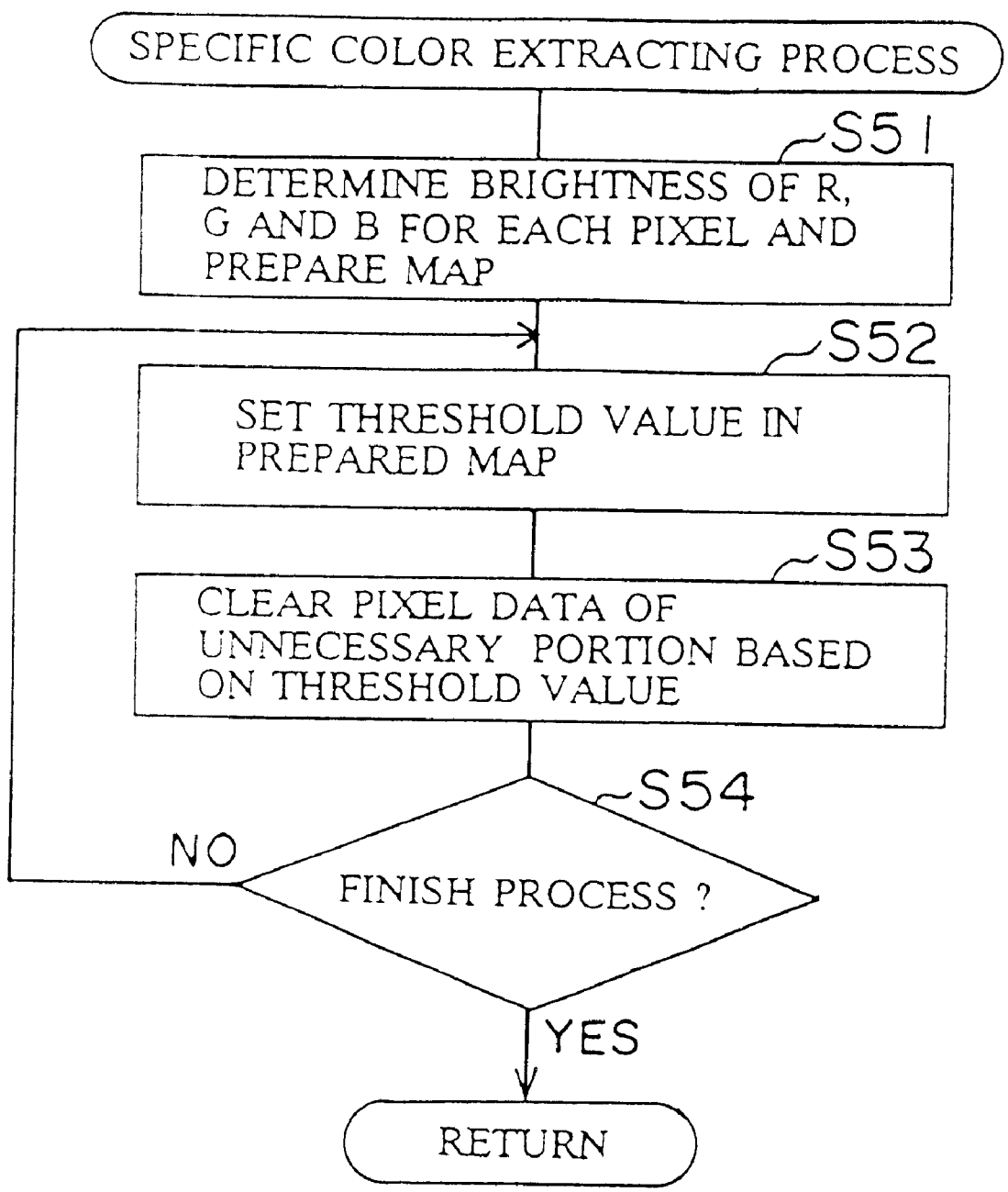
FIG. 3 is a flow chart showing a specific color extracting process.

As shown in FIG. 3, when the specific color extracting process starts, the CPU 15 detects the brightness of each of the red (R), green (G) and blue (B) components on a pixel by pixel basis for each pixel of the seal imprint surface data expanded in the work RAM 19 and prepares a map by specifying each pixel with the brightness of three colors (step S51). Image data of a bill or a check is classified into pixels of dark red corresponding to the seal imprint, pixels of dark blue corresponding to the pattern, and pixels corresponding to rules lines and letters, etc. distributed among the area between these colors.

The CPU 15 properly sets the threshold value on the map prepared in step S51 (step S52), and clears the data of pixels which are not contained in the color distribution corresponding to the seal imprint using the threshold value to renew the map and the seal imprint surface data (step S53). The CPU 15 subsequently determines whether or not to finish the specific color extracting process, i.e., whether pixels which are not contained in the color distribution corresponding to the seal imprint remain in the map (step S54) or not. If pixels remain, which are not contained in the color distribution corresponding to the seal imprint, the CPU 15 repeats the process of steps S52 and S53, and if such pixels do not remain, the CPU 15 finishes the specific color extracting process and proceeds the process to step S6 of the main routine.

Figure 4:
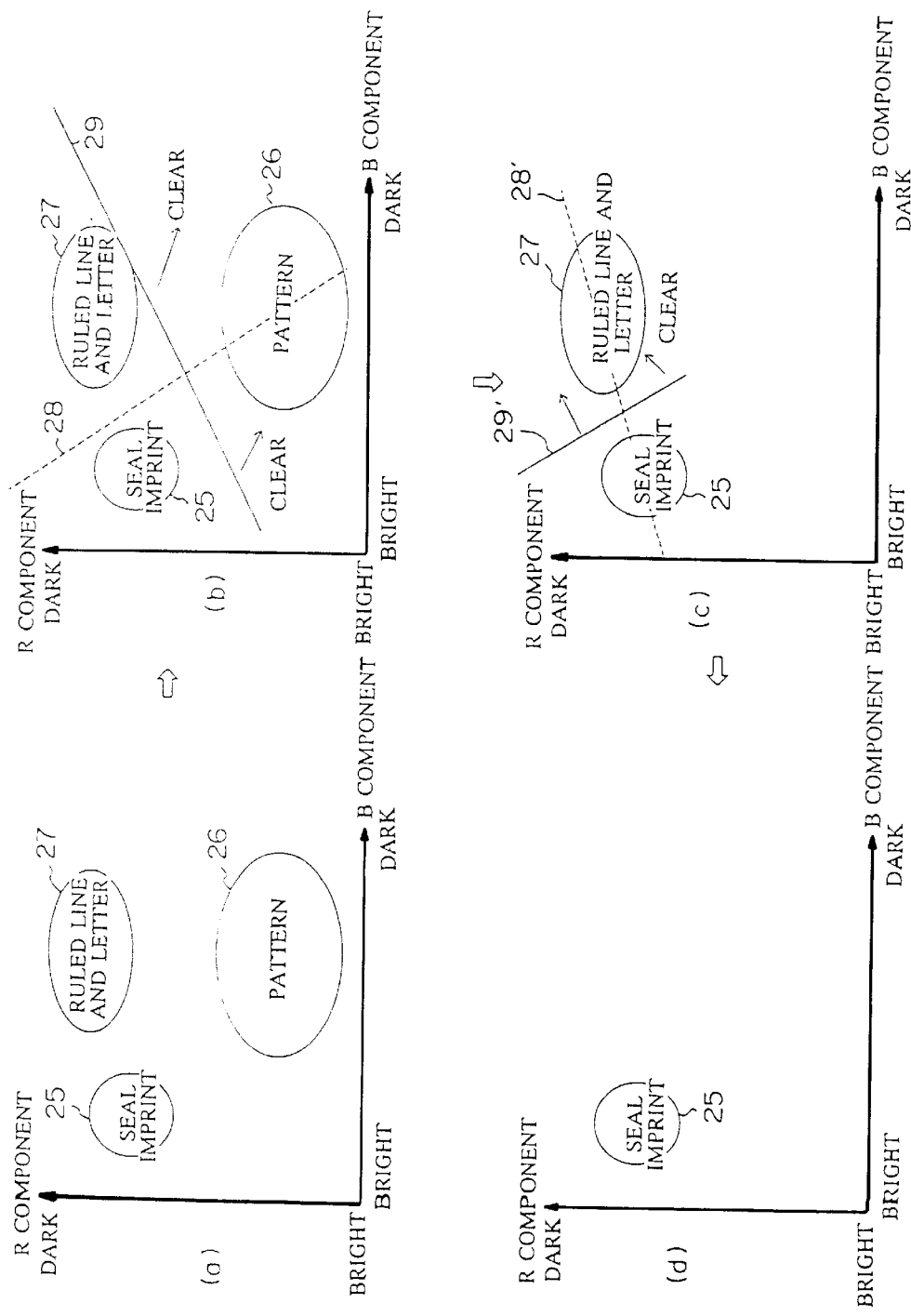
FIG. 4 is an explanatory illustration of the specific color extracting process.

FIG. 4 is an explanatory drawing illustrating the above-mentioned specific color extracting process. When each pixel of the map prepared in step S51 is expanded in the three dimensional coordinates with the brightness of each of the color R, G and B as axes, the distribution such as shown in FIG. 4(*a*) is obtained. Further, although only the brightness axes of two colors, R and B, are shown in FIG. 4, the brightness axis of green is actually set in the direction vertical against the paper surface. FIG. 4(*a*) is shown as the projection of a three dimensional distribution to the two dimensional plane, and contains a color distribution of the seal imprint (seal imprint distribution) 25, a color distribution of the pattern (pattern distribution) 26, and a color distribution of the ruled lines and letters (ruled line and letter distribution) 27.

The threshold value set on the map shown in FIG. 4(*a*) in step S52 is described by a border plane 29 vertically set against an approximate segment 28 shown by dashed lines as shown in FIG. 4B. Incidentally, in FIG. 4(*b*), the border plane 29 is shown as a line crossed with the plane including the R brightness axis and the B brightness axis. The approxi- mate segment 28 is drawn so as to pass between the seal imprint distribution 25 and the ruled line and letter distribution 27, and approximately divide equally the pattern distribution 26. The border plane 29 is set so as to cross the approximate segment 28 in a right angle and pass between the seal imprint distribution 25, the ruled line and letter distribution 27 and the pattern distribution 26.

In step S53, the border is a border, and pixel data in the area with read component brighter than the border plane 29 and the area with blue component darker than the border plane 29 are cleared. The map renewed as a result of clearing the data includes the seal imprint distribution 25 and the ruled line and letter distribution 27 as shown in FIG. 4(*c*). Therefore, the process is not considered as finished in step S54 and steps S52 and S53 are executed again.

The threshold value set on the map shown in FIG. 4(*c*) in step S52 is described by a border plane 29' vertically set against an approximate segment 28' shown by dashed lines. Incidentally, in FIG. 4(*c*), the border plane 29' is shown as a line crossed with the plane including the R brightness axis and the B brightness axis. The approximate segment 28' is drawn so as to pass the center of the seal imprint distribution 25 and the ruled line and letter distribution 27, and the border plane 29' is set so as to cross the approximate segment 28' in a right angle and to pass between the seal imprint distribution 25 and the ruled line and letter distribution 27.

In step S53, the pixel data in the area with blue component brighter than the border plane 29' and the area with red component brighter than the border plane 29' are cleared. The map renewed as a result of clearing the data includes the seal imprint distribution 25 only as shown in FIG. 4(*d*). Therefore, the process is considered as finished in step S54 and the process returns to step S6 of the main routine and continues.

The process in steps S52 to S54 is conducted N−1 times when the number of color distributions included in the map prepared in step S51 is N. In the example shown in FIG. 4, since the number of color distributions is (N=) 3, the process in steps S52 to S54 is conducted twice.

When having proceeded the process to step S6, the CPU 15 conducts the process for reading an image data of the reference seal imprint (hereinafter referred to as "reference seal imprint data"). That is, the CPU 15 is in the condition to wait the input of a retrieval key for reading out the reference seal imprint data from the DB 13 and displays a message prompting the input of a retrieval key on the display 14.

When an operator inputs a retrieval key (for example, an account number) in response to the message, the CPU 15 searches the DB 13 with the retrieval key and reads out the reference seal imprint data corresponding to the retrieval key from the DB 13 to store it in the work RAM 19. The CPU 15 thereafter proceeds the process to step S7.

Figure 5:
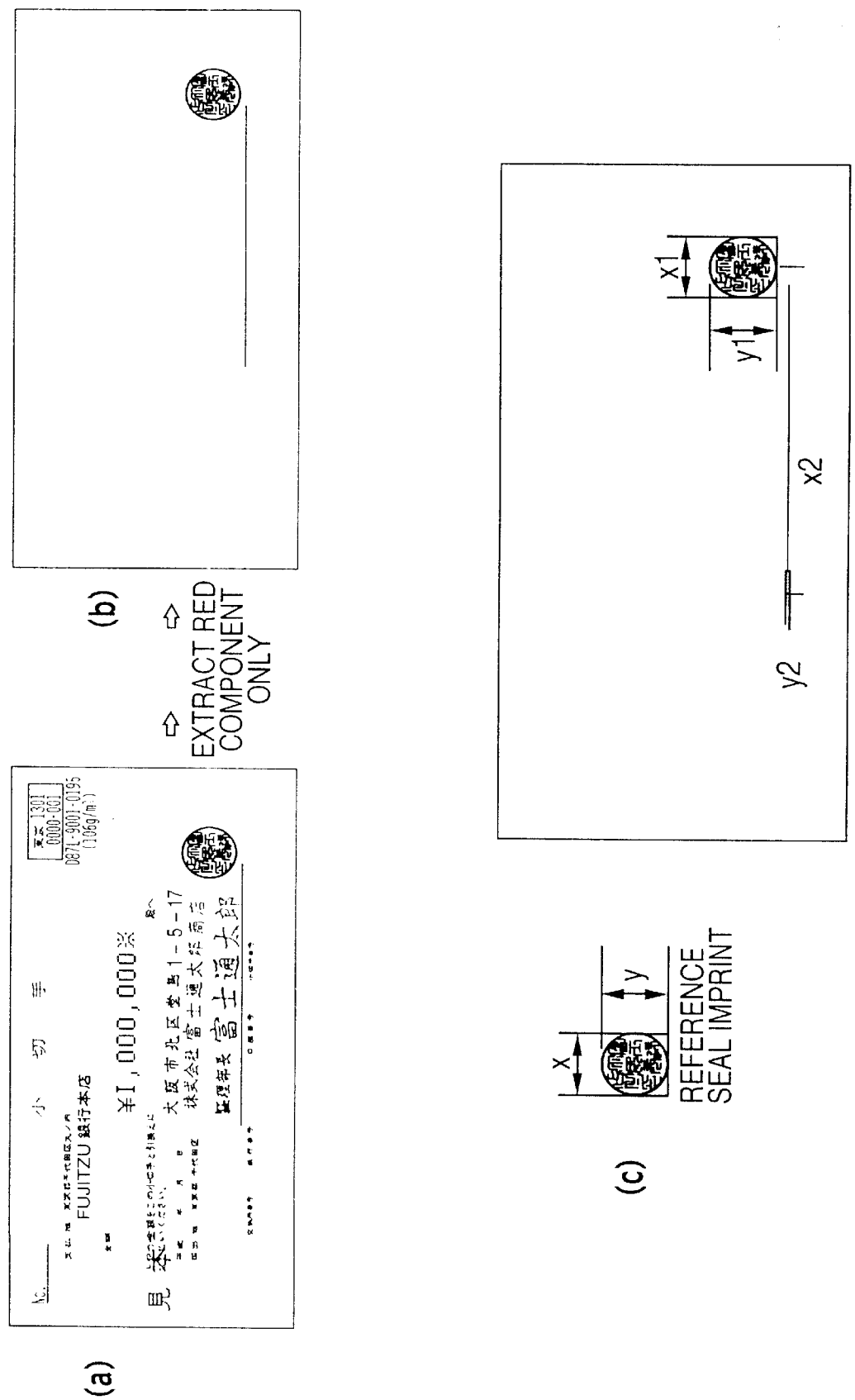
FIG. 5 is an explanatory illustration of the target data acquisition process.

When having proceeded the process to step S7, the CPU 15 conducts the process for capturing the target seal imprint data from the seal imprint surface data. FIG. 5 is an explanatory illustration of the target seal imprint data capturing process. Before starting the process of step S5, the seal imprint surface data expanded in the work RAM 19 is in the condition where image data of ruled lines, letters, a pattern and a seal imprint are included as shown in FIG. 5(*a*), and when the process of step S5 finishes, only the image data having the color of the target seal imprint (red) remains in the seal imprint surface data in the work RAM 19. However, in some case, the image data of the base line for stamping a signature seal, for example, remains as an image data having red color in addition to the target seal imprint data as shown in FIG. 5(b).

In step S7, the CPU 15 detects the length "y" in the vertical direction and the length "x" in the horizontal direction of the reference seal imprint read in step S6. The CPU 15 subsequently acquires as a target seal imprint data an image data having the size closest to the "y" and "x" from the seal imprint surface data currently unfolded in the work RAM 19 (equivalent to the size information extracting means).

For example, if two pieces of image data remain as a seal imprint surface data expanded in the work RAM 19 as shown in FIG. 5(c), the CPU 15 calculates the length of image data along the longitudinal direction of a bill, etc. as "x1" and the length along the latitudinal direction of a bill as "y1", and calculates the length of another image data along the longitudinal direction of a bill, etc. as "x2" and the length along the latitudinal direction of a bill as "y2".

The CPU 15 then compares "x1" and "y1" with "x" and "y" and also compares "x2" and "y2" with "x" and "y". In the example shown in FIG. 5(c), since the sizes of "x1" and "y1" are close to those of "x" and "y", the CPU 15 acquires the image data having the sizes of "x1" and "y1" as the target seal imprint data.

As described above, according to the embodiment, the target seal imprint can be precisely specified by specifying it based on the color information and the size information by steps S5 and S7.

When the above-mentioned process of step S7 finishes, the target seal imprint data capturing process is finished and the CPU 15 proceeds the process to step S8.

The CPU 15 subsequently executes a subroutine of an external frame removing process for removing an external frame portion of the seal imprint from each of the reference seal imprint data and the target seal imprint data (step S8). The external frame removing process is an option which can be selected by an operator, and its subroutine will be described later.

The CPU 15 subsequently displays an image based on the target seal imprint data acquired in step S7 on the display 1, and at the same time displays a message prompting the input of instruction for starting either of the ordinary verifying process or the partial seal imprint verifying process on the display 14, and is in the input standby condition.

An operator, referring to the image of the target seal imprint displayed on the display 14, inputs from the inputting apparatus 21 an instruction for starting the ordinary verifying process if the target seal imprint has been captured in the complete form or an instruction for starting the partial seal imprint verifying process if the target seal imprint is a partial seal imprint. The CPU 15 determines whether or not the input instruction for starting process is the ordinary verifying process (step S9) and proceeds the process to step S10 or step S11 depending on the result of the determination.

Figure 6:
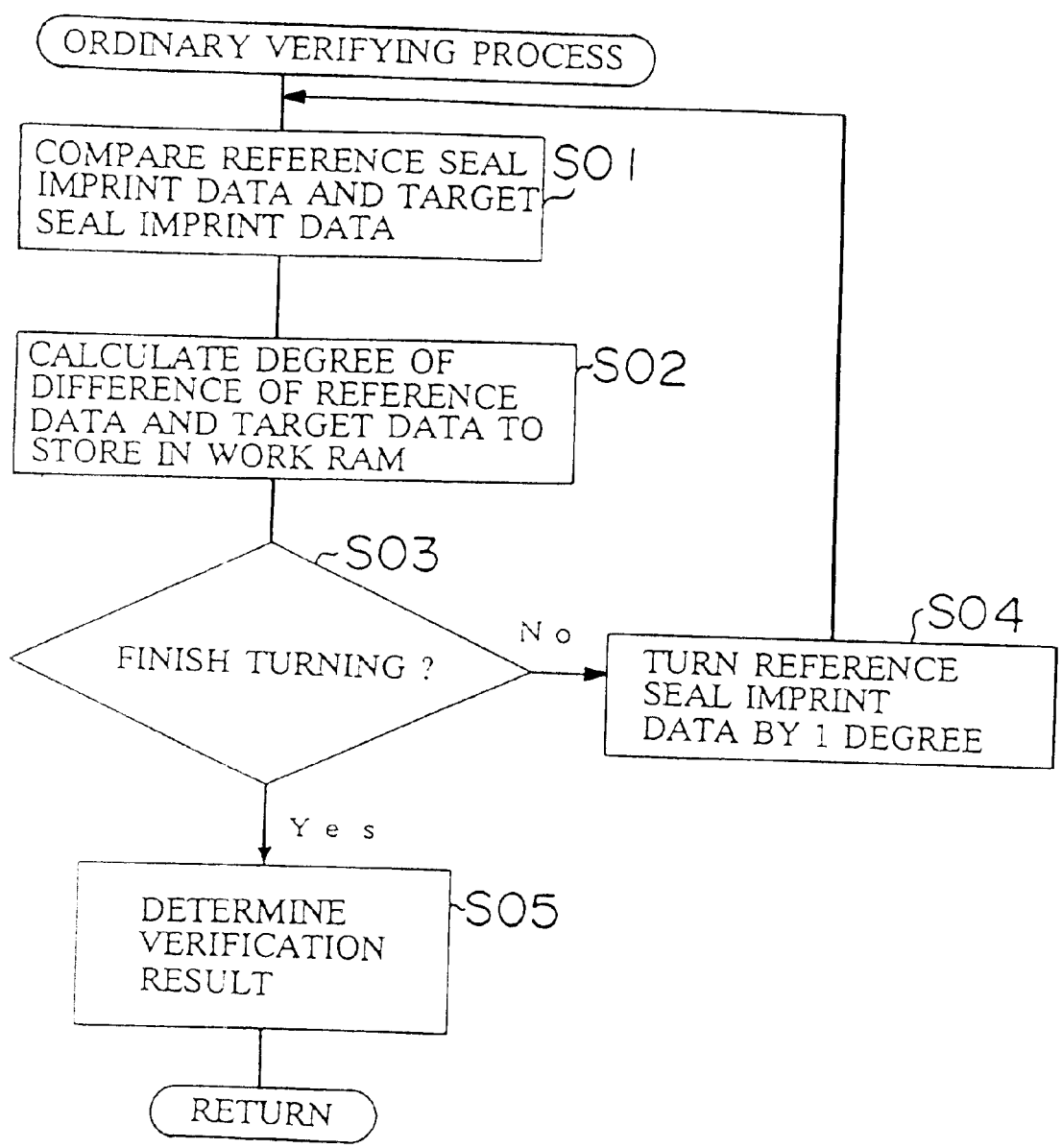
FIG. 6 is a flow chart showing a normal verifying process.

The ordinary verifying process by the seal imprint verifying apparatus 10 (the subroutine of step S10 shown in FIG. 2: equivalent to the determining means) is now described according to a flow chart shown in FIG. 6. The ordinary verifying process is the process, while turning the reference seal imprint by the pitch of 1 degree, for repeatedly detecting the degree of difference between the reference seal imprint and the target seal imprint across the area of 360 degrees and verifying both seal imprints based on the detected degree of difference across the area of 360 degrees.

The CPU 15, upon receiving an instruction for starting the ordinary verifying process, compares the reference seal imprint data stored in the work RAM 19 and the target seal imprint data (step S01) and calculates the degree of difference acquired by the comparison to store it (step S02).

The CPU 15 subsequently determines if the turning of the reference seal imprint data has been finished, i.e., whether or not the reference seal imprint data has been turned 360 degrees (step S03). If the turning has not been finished, the CPU 15 proceeds the process to step S04 and, after turning the reference seal imprint data 1 degree, returns the process to step S01. The direction of letters of the reference seal imprint data is changed by turning the reference seal imprint data as described above. On the other hand, if the turning is finished, the CPU 15 proceeds the process to step S05. Incidentally, the direction for turning the reference seal imprint data may be clockwise or may be anti-clockwise. In addition, the target seal imprint data may be turned instead of the reference seal imprint data.

As described above, the CPU 15 repeatedly conducts the process of step S01 to step S04 until an affirmative determination is made in step S03. Even if the directions of the letters of reference seal imprint data and the target seal imprint data are different at the time of staring the verifying process, the degree of difference in case that the directions of the letters of both seal imprint data are substantially agreed with each other, can be acquired.

When having proceeded the process to step S05, the CPU 15 determines the verification result between the reference seal imprint data and the target seal imprint data. In determining the result, the CPU 15 extracts the minimum value out of the degree of difference stored in step S02 and compares the minimum value with the predetermined threshold value. The minimum value of the degree of difference can be considered as a degree of difference where the slants and the directions of the letters of both the reference seal imprint data and the target seal imprint data substantially agree with each other.

The CPU 15 determines that the target seal imprint agrees with the reference seal imprint when the minimum value of the degree of difference is smaller than the threshold value. On the contrary, the CPU 15 determines that the target seal imprint does not agree with the reference seal imprint when the minimum value is larger than the threshold value. The CPU 15 then gives an instruction for displaying the determination result on the display 14 to the display controlling device 17. The CPU 15 thereafter finishes the subroutine of the ordinary verifying process and finishes the automatic verifying process of the main routine (see FIG. 2).

As described above, according to the seal imprint verifying apparatus 10 of the embodiment, the target seal imprint data is captured by the target seal imprint data capturing process, and the automatic verifying process of an seal imprint is conducted between the target seal imprint data and the reference seal imprint data. Therefore, an actual object such as a bill is not required in the verifying work at the time of finishing step S2 described above. As a result, the verifying work can be simplified and the efficiency of work can be improved.

Figure 7:
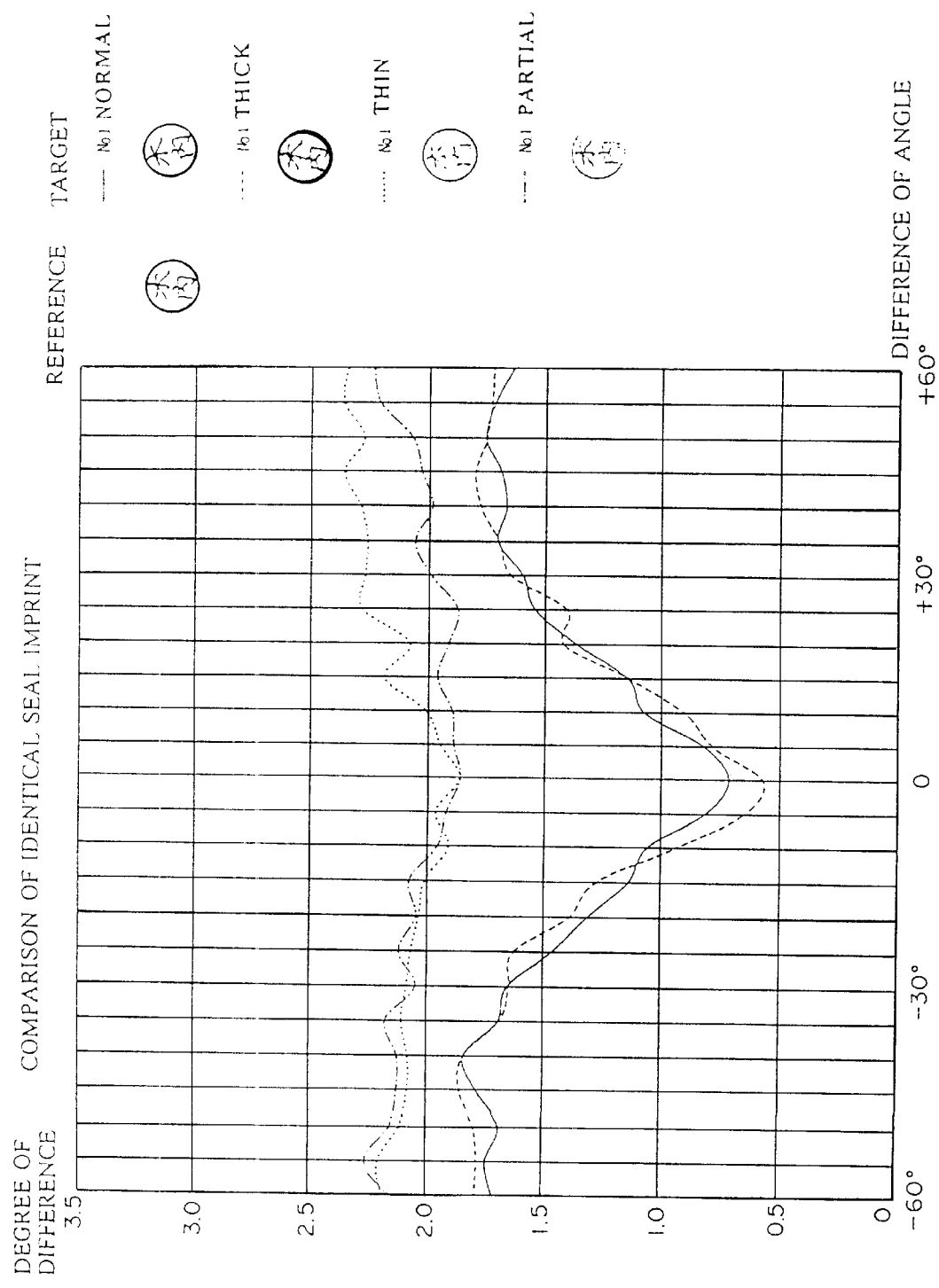
FIG. 7 is an explanatory illustration of a verification determination.

FIG. 7 is a graph showing the degree of difference when target seal imprints data are collated with a reference seal imprint data that is formed by an identical seal with the target seal imprints. In an example shown in FIG. 7, a seal imprint which is a seal imprint by the identical seal as the reference seal imprint data, and has approximately the same thickness of color as that of the reference seal imprint (ordinary seal imprint, solid line), an seal imprint thicker in color than the reference seal imprint (thick color seal imprint, long dashed line), an seal imprint thinner than the reference seal imprint (thin color seal imprint, short dashed line), and an seal imprint with a part of the seal imprint is cut due to a partial seal (partial seal imprint, alternate long and short dash line) are shown as the target seal imprint data. Incidentally, data in case that the verification is conducted without executing the external frame removing process of step S8 is shown in the example.

In the "ordinary seal imprint" and the "thick seal imprint" which can be determined as a seal imprint properly stamped, the degree of difference shows the minimum value when the difference of angle between the reference seal imprint data and the target seal imprint data is 0 degree. The larger the difference of angle of both seal imprint data becomes, the larger the degree of difference becomes.

On the contrary, in the "thin seal imprint" and the "partial seal imprint" which can be determined as improperly stamped, the degree of difference is large irrespective of the difference of angle between both seal imprint data.

Figure 8:
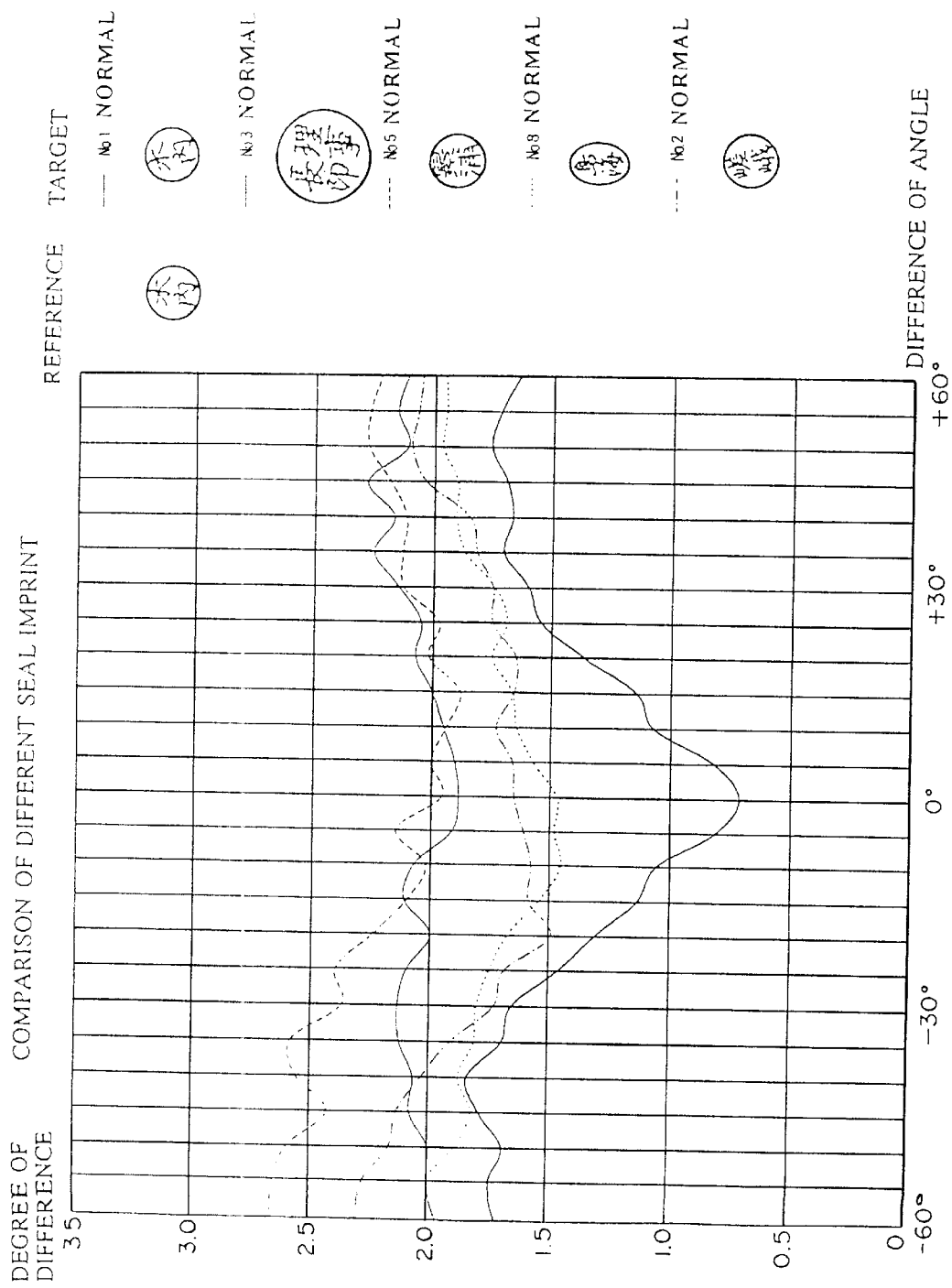
FIG. 8 is an explanatory illustration of the verification determination.

FIG. 8 is a graph showing the degree of difference when an image data of the "ordinary seal imprint" (thick solid line) by the identical seal and an image data of the "ordinary seal imprint" (thin solid line, long dashed line, short dashed line, alternate long and short dash line) by a plurality of different seals are collated with a certain reference seal imprint data. As shown in FIG. 8, in case of the "ordinary seal imprint" by the seal identical with the reference seal imprint data, the difference of angle is 0 degree being the minimum value and, in case of the "ordinary seal imprint" by the different seal, the degree of difference becomes large irrespective of the difference of angle.

In the seal imprint verifying apparatus 10 according to the present embodiment, the threshold value of the degree of difference is set as 1.0 due to the characteristics shown in FIG. 7 and FIG. 8. The CPU 15 determines that the target seal imprint agree with the reference seal imprint if the degree of difference is below 1.0, and determines that the target seal imprint does not agree with the reference seal imprint if the degree of difference is larger than 1.0.

Figure 9:
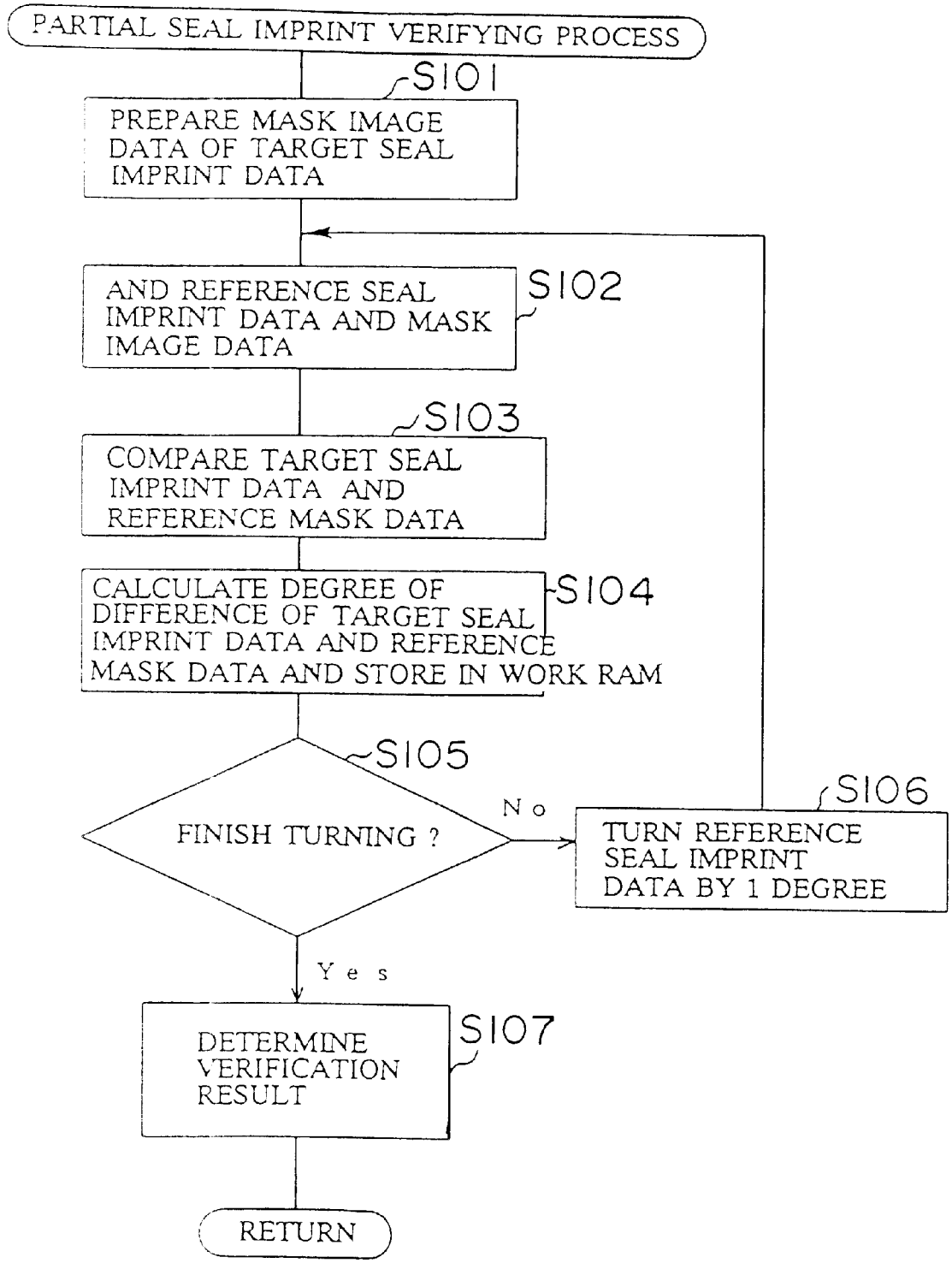
FIG. 9 is a flow chart showing a partial seal imprint verifying process.

The partial seal imprint verifying process (subroutine of step S11 shown in FIG. 2) by the seal imprint verifying apparatus 10 is now described in accordance with a flow chart shown in FIG. 9. The partial seal imprint verifying process is the process for preparing a mask that agrees with the external shape of the target seal imprint, and while turning the reference seal imprint by 1 degree, repeatedly detecting the degree of difference between a new reference seal imprint formed by being composed with the mask and the target seal imprint across the area of 360 degrees, and verifying both seal imprints based on the degree of difference detected across the area of 360 degrees.

In the partial seal imprint verifying process, the CPU 15 prepares a mask image data of the target seal imprint data (step S101: equivalent to the mask image preparing means). That is, the CPU 15 detects the external shape of the image data of the partial target seal imprint data(see FIG. 10(*a*)) stored in the work RAM 19 and prepares a mask image data of its external shape.

For example, it is assumed that the brightness value of each pixel in the part forming the letters and the frame of the target seal imprint data is "1" and the brightness value of each pixel in the part forming internal spaces and outside area of the target seal imprint data is "0". The CPU 15 checks toward the center of the target seal imprint data from the circumference thereof whether the brightness value of each pixel is "1" or "0" (see FIG. 10(*b*)). The CPU 15 then specifies the external edge of the target seal imprint data judging from a set of pixels with the brightness value "1" located far most external circumference and prepares a mask image data with the brightness value of all the pixels inside the external edge as "1" (see FIG. 10(*c*)).

When having prepared the mask image data, the CPU 15 calculates the logical product of the mask image data and the reference seal imprint data (step S102). That is, the CPU 15 conducts the logical product operation of the brightness value of each pixel forming the mask image data and the brightness value of each pixel forming the reference seal imprint data. The image data obtained by the logical product operation is referred to as the reference mask data (composed reference image data) and distinguished from the original reference seal imprint data. The reference seal imprint data having the external shape approximately identical with the target seal imprint data is acquired by the process of step S102 (equivalent to the image data composing means).

The CPU 15 subsequently compares the target seal imprint data and the reference mask data acquired in step S102 (step S103) and calculates the degree of difference on this occasion to store it (step S104).

The CPU 15 subsequently determines if the turning of the reference seal imprint data has been finished, i.e., whether or not the reference seal imprint data has been turned 360 degrees (step S105). If the turning of the reference seal imprint data has not been finished, the CPU 15 returns the process to step S102 after proceeding the process to step S106 and turning the reference seal imprint data 1 degree. On the other hand, if the turning of the reference seal imprint data has been finished, the CPU 15 proceeds the process to step S107. Further, the direction for turning the reference seal imprint data may be clockwise or may be anti-clockwise.

As described above, the CPU 15 repeatedly conducts the process of step S102 to step S106 until an affirmative determination is made in step S105. Even if the directions of the letters of reference mask data and the target seal imprint data are different at the time of starting the verifying process, the degree of difference in case the directions of the letters of both data can be acquired.

When having proceeded the process to step S107, the CPU 15 determines the verification result of the reference seal imprint data and the target seal imprint data. That is, the CPU 15 extracts the minimum value of the degree of difference stored in step S104 and determines whether or not the minimum value of the degree of difference is below the predetermined threshold value.

If the minimum value is below the threshold value, it is displayed on the display 14 that the target seal imprint agree with the reference seal imprint. On the contrary, if the degree of difference is larger than the threshold value, it is displayed on the display 14 that the target seal imprint does not agree with the reference seal imprint. The CPU 15, when the process of step S107 finishes, then finishes the subroutine of the partial seal imprint verifying process to return the process to the main routine and finishes the automatic verifying process of the main routine (see FIG. 2).

Figure 11:
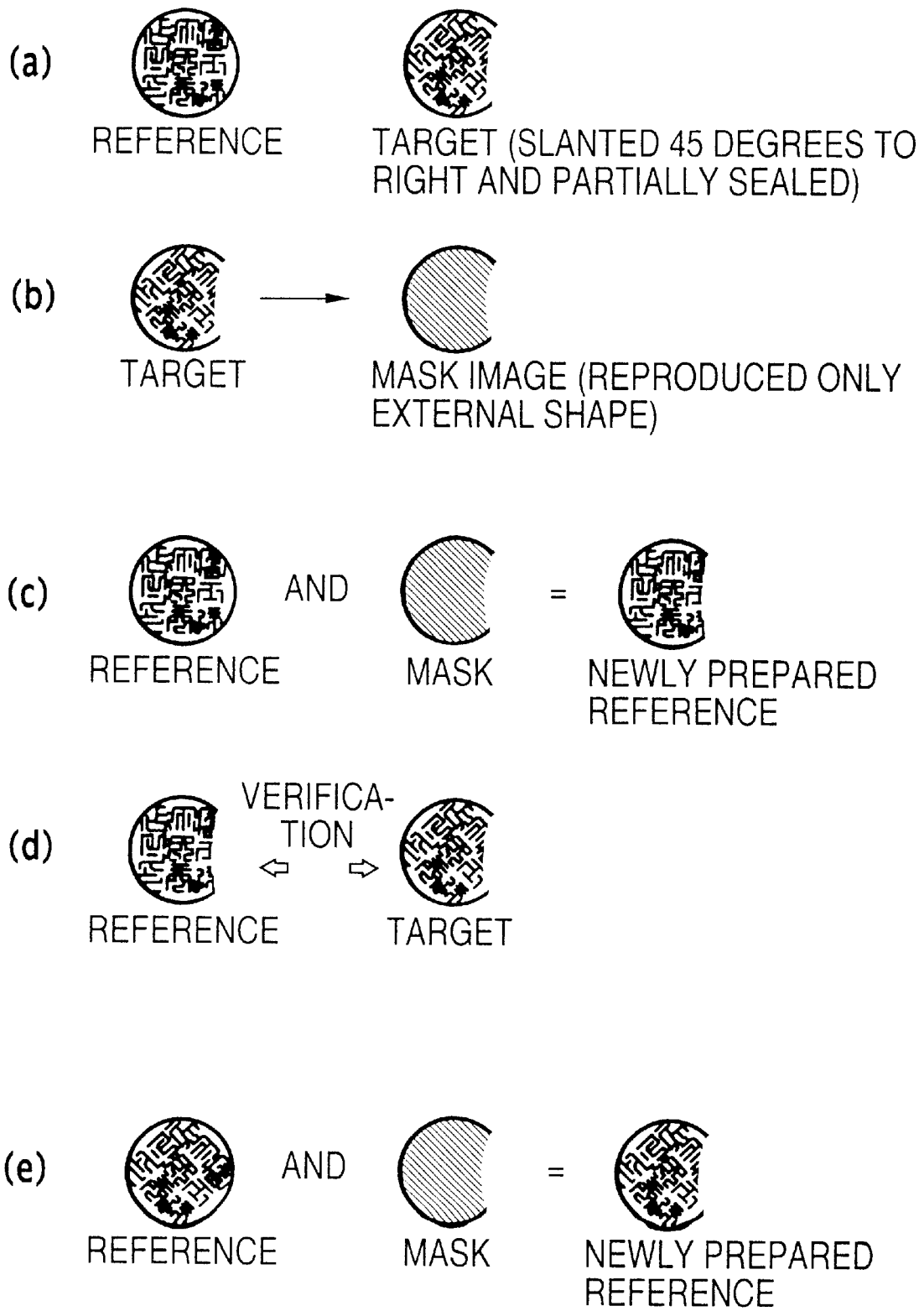
FIG. 11 is an explanatory illustration of a partial seal imprint verifying process.

FIG. 11 is an explanatory illustration showing an example of the above-mentioned partial seal imprint verifying process. As shown in FIG. 11(*a*), the example shows the case in which the reference seal imprint data and the target seal imprint data is the image data of a seal imprint by the identical seal. However, the seal imprint of the target seal imprint data is slanted approximately 45 degrees to the clockwise direction compared to the seal imprint of the reference seal imprint data and lacks a part due to the partial seal. Further, the example shows the case in which verification is conducted without executing the external frame removing process of step S8.

When having started the partial seal imprint verifying process, the CPU 15 prepares a mask image data (step S101). A mask image data of a shape with a part of a circle cut as shown in FIG. 11(*b*).

The CPU 15 subsequently conducts the logical product operation of the reference seal imprint data and the mask image data. The reference seal imprint data having the external shape of the target seal imprint data, i.e., the reference mask data is prepared as shown in FIG. 11(*c*).

The CPU 15 subsequently compares the reference mask data and the target seal imprint data (step S103) as shown in FIG. 11(*d*) and acquires their degree of difference (step S104). The CPU 15 thereafter repeatedly conducts the process of step S102 to step S106 each time the reference seal imprint data is turned by the predetermined angle (1 degree).

When the process of step S102 is conducted in such a condition that the reference seal imprint data is slanted approximately 45 degrees to the clockwise direction from the initial condition as shown in FIG. 11(*e*), the reference mask data approximately agrees with the target seal imprint data.

When the reference mask data shown in FIG. 11(*e*) and the target seal imprint data are compared in step S103, the degree of difference to be stored in step S104 becomes minimum and becomes smaller than the threshold value. In step S107, since the verification result is determined using the minimum value of the degree of difference, it is displayed on the display 14 that the target seal imprint data agrees with the reference seal imprint data.

As described above, if the seal imprint stamped on a bill, etc. is in such a condition that a part is cut due to the partial seal, etc., the CPU 15 prepares a mask image showing the external shape of the target by the partial seal imprint verifying process, prepares a reference mask data based on the logical product of the mask image and the reference seal imprint data and compares the reference mask data with the target seal imprint data to determine whether or not both data agree with each other. Therefore, even if the seal imprint on a bill is the partial seal imprint, the verifying process can determine an agreement or a disagreement with high accuracy.

Figure 12:
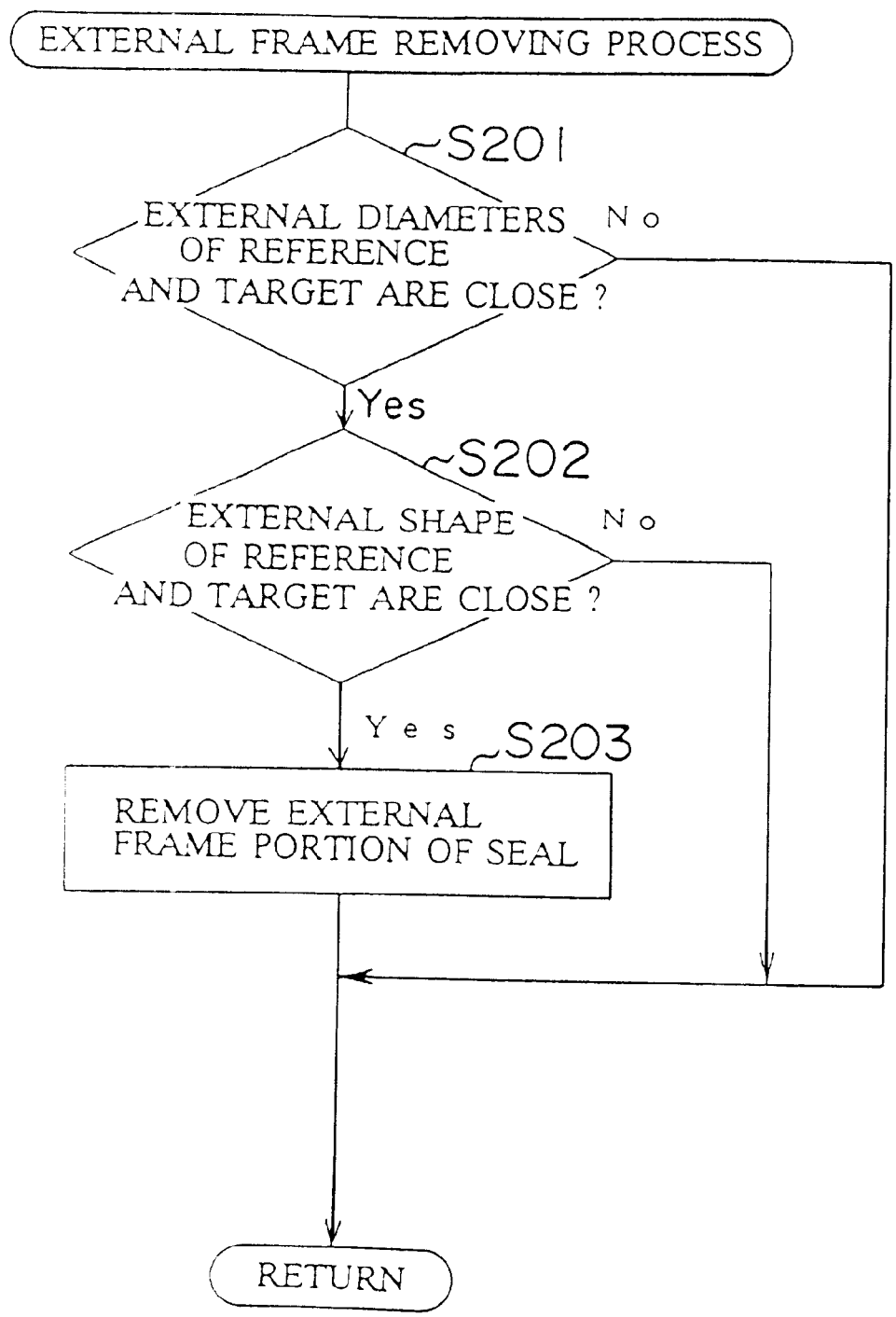
FIG. 12 is a flow chart showing an external frame removing process of a seal imprint.

The external frame removing process of the seal imprint (subroutine of step S8 shown in FIG. 2) by the seal imprint verifying apparatus 10 is now described in accordance with the flow chart shown in FIG. 12. In the above-mentioned ordinary verifying process and the partial verifying process, if the external frame portion of each seal imprint to be compared has the identical size and shape, the degree of difference (rate of verification) regarding the shape of the external frame portion affects the degree of difference of the entire seal imprint, and there is possibility that seal imprints with different letters are determined to agree with each other. The external frame removing process is the process for removing the external frames from the reference seal imprint and the target seal imprint before verification in order to prevent such error of determination. However, an operator can select whether or not to execute the external frame removing process.

In FIG. 12, when the external frame removing process starts, the CPU 15 determines whether or not the external diameter of the reference seal imprint data is close to the external diameter of the target seal imprint (step S201: equivalent to the external diameter determining means). That is, the CPU 15 calculates the external diameter of the reference seal imprint data at several positions (several directions) and calculates the external diameter of the target seal imprint at several positions. The CPU 15 subsequently compares each of the calculated external diameters of the target seal imprint data with each of the calculated external diameters of the reference seal imprint data to determine whether or not there are any diameters that approximately agree with each other.

The CPU 15, at this time, considers that the external diameter of the reference seal imprint data is close to the external diameter of the target seal imprint data (can be recognized as agreeing with each other) if there are any values agreeing with each other among a plurality of external diameters calculated for both seal imprint data and proceeds the process to step S202. On the contrary, the CPU 15 finishes the subroutine of the external frame removing process if there is no values agreeing with each other among the external diameters of both seal imprint data and proceeds the process to step S9 of the main routine shown in FIG. 2.

When having proceeded the process to step S202, the CPU 15 determines whether or not the external shapes of the reference seal imprint data and the target seal imprint data are close (equivalent to the external shape determining means). That is, the CPU 15 acquires the external shape of the reference seal imprint data by the same process as in the case of preparing the above-mentioned mask image data and acquires the external shape of the target seal imprint data.

The CPU 15 subsequently compares both external shapes to determine whether or not they are close, i.e., whether or not the degree of difference of both external shapes are below the predetermined threshold value. If the degree of difference is determined as below the threshold value, the CPU 15 considers that both external shapes agree with each other and proceeds the process to step S203. If the degree of difference is determined as larger than the threshold value, the CPU 15 finishes the subroutine of the external frame removing process and proceeds the process to step S9 of the main routine shown in FIG. 2.

When having proceeded the process to step S203, the CPU 15 deletes the external frame portion from the reference seal imprint data and deletes the external frame portion from the target seal imprint data. When the process of step S203 finishes, the CPU 15 finishes the subroutine of the external frame removing process and proceeds the process to step S9 of the main routine shown in FIG. 2.

FIG. 13 is a conceptual drawing of the external frame removing process of the seal imprint. For example, when the seal imprint of a circle seal of "Kiuchi" (left side) and the seal imprint of a circle seal of "Kageura" having the identical external frame shapes are collated as shown in FIG. 13(*a*), if the external frame removing process of the seal imprint is executed, external frames are removed from both seal imprints and the letter portion of "Kiuchi" and the letter portion of "Kageura" remain as shown in FIG. 13(*b*). The verifying process is then conducted on them.

As described above, if the external frame removing process is executed, since the seal imprints can be collated with their external frames being the major feature portions excluded, small differences of both seal imprints existing in the letter portions of the seal imprints can be determined. Therefore, the accuracy of the ordinary verifying process in step S10 or the partial seal imprint verifying process in step S11 is increased. Further, when a part of the external frame portion of the target seal imprint is cut out, there is another advantage that the appropriate verifying process of the seal imprint can be conducted by removing the external frame portion of the seal imprint.

[Verifying process by an operator]

The seal imprint verifying apparatus 10 according to the present preferred embodiment can determine the agreement/ disagreement of a reference seal imprint and a target seal imprint by the above-mentioned automatic verifying process, but in some actual verification, requires visual confirmation by an operator for the confirmation of the result of the automatic verification or without conducting automatic process.

In the seal imprint verifying apparatus 10 according to the preset embodiment, when an operator conducts visual confirmation work, an image based on the reference seal imprint data and an image based on the target seal imprint data are displayed in color and in an actual size on the display 14 and, for supporting the confirmation work, a first and a second seal imprint blinking process can be conducted in turn or selectively. An operator can conduct confirmation work by looking at the image of the seal imprint displayed on the display 14 without using an actual object such as a bill.

The overlapping process of seal imprints used in the first and the second seal imprint blinking process is first described. The overlapping process of seal imprints comprises the transparent overlapping process and the non-transparent overlapping process.

The transparent overlapping process herein described is the process for displaying on the display 14 an image in which the target seal imprint is overlapped on the reference seal imprint and the reference seal imprint can be seen through the target seal imprint (overlapped image). On the other hand, the non-transparent overlapping process is the process for displaying on the screen 14 an image in which an image of the target seal imprint is overlapped on an image of the reference seal imprint and the image of the reference cannot be seen.

Figure 15:
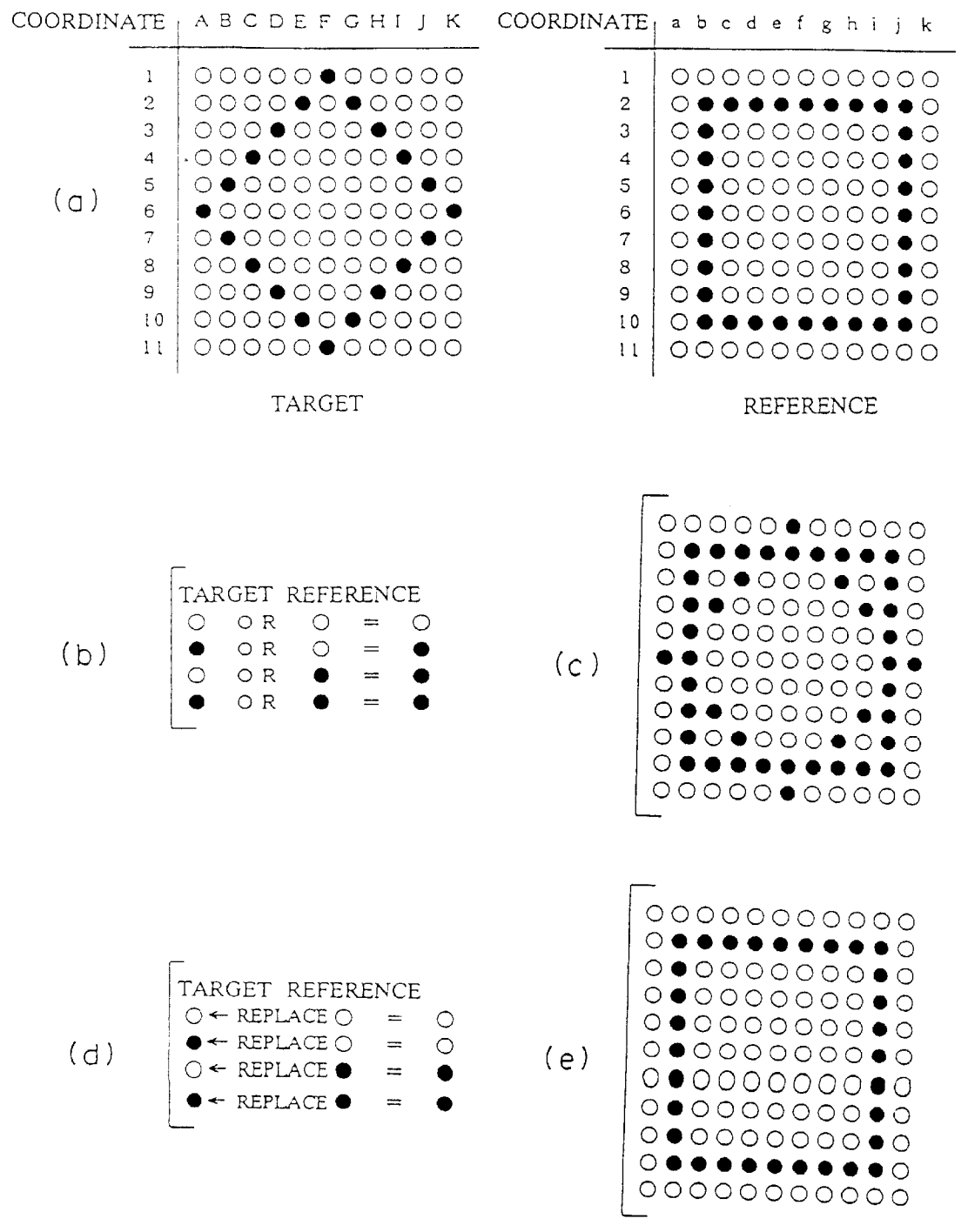

FIG. 14(a) is a flow chart for showing the transparent overlapping process, FIGS. 15(a) to (c) are explanatory illustration of the transparent overlapping process, FIG. 16(a) is a drawing showing an example of an image display by the transparent overlapping process.

When the transparent overlapping process starts, the CPU 15 calculates the logical sum of the reference seal imprint data stored in the work RAM 19 and the target seal imprint data. That is, the CPU 15 calculates the logical sum of the brightness value of each pixel forming the reference seal imprint data and the brightness value of each pixel forming the target seal imprint data corresponding to each pixel (step S301).

The CPU 15 subsequently prepares an new image data based on the result of the process (calculation result of the logical sum) in step S301 (step S302). The CPU 15 then displays the image of the image data on the display 14 (step S303) and finishes the transparent overlapping process.

For example, as shown in FIG. 15(a), it is assumed that a diamond shaped target seal imprint data and a square reference seal imprint data are stored in the work RAM 19. Here, it is assumed that the white circle shown in FIG. 15(a) shows an pixel with the brightness value "0" and the black circle shows a pixel with the brightness value "1". Further, it is assumed that, in FIG. 15(a), the coordinate of the target seal imprint data has the coordinate (A, 1) as the origin and the coordinate of the reference seal-imprint data has the coordinate (a, 1) as the origin, and coordinate (a, 1) corresponds to the coordinate (A, 1).

In this case, when the above-mentioned process of step S301 is conducted by the CPU 15, each logical sum of the brightness value of corresponding pixel is calculated between the reference seal imprint data and the target seal imprint data (see FIG. 15(b)). Subsequently, the image data shown in FIG. 15(c) is prepared by the process of step S302 and the transparent overlapped image is displayed on the display 14 (step S303).

For example, as shown in FIG. 16(a), when target seal imprint is the seal imprint of a circle seal of "Kiuchi" and the reference seal imprint is the seal imprint of a circle seal of "Kageura", if the above-mentioned transparent overlapping process is executed, both seal imprints of "Kiuchi" and "Kageura" are overlapped and displayed on the display 14. Both seal imprints then are displayed in such a condition that the direction of their letters agree with each other.

The image of the seal imprint displayed on the display 14 is in color. Here, when the reference seal imprint and the target seal imprint are displayed in different colors and they are overlapped, the image of the seal imprint may be composed so that the overlapping portion is further displayed with different colors. For example, the image of the seal imprint may be composed so that the reference seal imprint is displayed in red, the target seal imprint is displayed in blue and the overlapping portion of both seal imprint is displayed in purple.

FIG. 14(b) is a flow chart showing the non-transparent overlapping process, FIGS. 15(d) and (e) are explanatory illustrations of the non-transparent overlapping process and FIG. 16(b) is a drawing showing an example of image display by the non-transparent overlapping process.

When the non-transparent overlapping process starts, the CPU 15 replaces the brightness value of each pixel forming the target seal imprint data stored in the work RAM 19 with the brightness value of each pixel of the corresponding reference seal imprint data (step S401). That is, the brightness value of a certain pixel of the target seal imprint data is set as "1" irrespective of the original value of the pixel of the target seal imprint data when the brightness value of the corresponding pixel in the reference seal imprint data is "1". And the pixel of the target seal imprint data is set as "0" when the corresponding pixel in the reference seal imprint data is "0".

The CPU 15 subsequently prepares an image data based on the replaced pixel data, makes the display 14 display an image based on the image data (step S403) and finishes the non-transparent overlapping process. Displayed on the display 14 is the image in such a condition that the reference seal imprint is overlapped on the target seal imprint and the target seal imprint cannot be seen because it is hidden below the reference seal imprint.

For example, when the reference seal imprint data and the target seal imprint data shown in FIG. 15(a) are stored in the work RAM 19, when the process of step S401 is executed by the CPU 15, the brightness value of each pixel forming the reference seal imprint data is replaced by the brightness value of each pixel of the corresponding target seal imprint data. For example, the brightness value of the pixel of the coordinate (A, 1) of the target seal imprint data is replaced by the brightness value of the pixel of the coordinate (a, 1) and the brightness value of the pixel of the coordinate (F, 5) is replaced by the brightness value of the pixel of the coordinate (f, 5).

When the CPU 15 subsequently prepares an image data based on the process result of step S401, the image data becomes the data identical with the reference seal imprint data. Therefore, for example, as shown in FIG. 16(b), it is assumed that, when the seal imprint of a circle seal of "Kiuchi" is displayed on the display 14 as the target seal imprint and the seal imprint of a circle seal of "Kageura" is displayed on the display 14 as the reference seal imprint, the process of the above-mentioned step S401 and step S402 is executed. Then, an image in which the seal imprint of "Kageura" is overlapped on the seal imprint of "Kiuchi" and only the seal imprint of "Kageura" can be visually confirmed (step S403).

Figure 17:
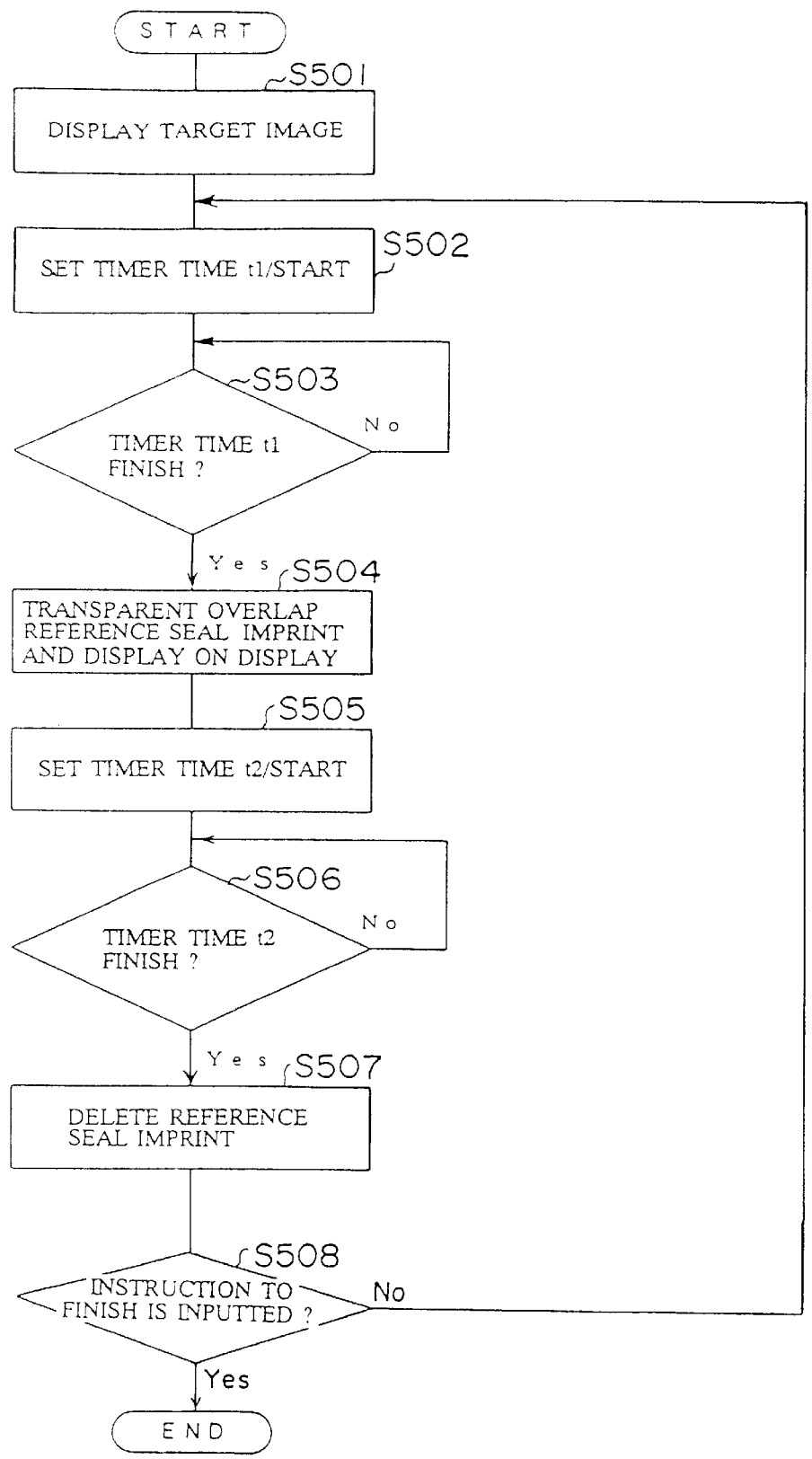
FIG. 17 is a flow chart showing a first seal imprint blinking process.
Figure 18:
FIG. 18 is an explanatory illustration of the first seal imprint blinking process.

The first seal imprint blinking process using the above-mentioned transparent overlapping process is now described. FIG. 17 is a flow chart showing the first seal imprint blinking process and FIG. 18 is an explanatory illustration of the first seal imprint blinking process. The first seal imprint blinking process is the process for alternatively displaying an image of a target bill, etc. and an image formed by overlapping the reference seal imprint on the seal imprint portion of the image data by the transparent overlapping process.

When the first seal imprint blinking process starts, the CPU 15 makes the display 14 display the image data of a target bill, etc. (image data showing the seal imprint surface of a target bill, etc. including the target seal imprint data, see FIG. 18(a)) (step S501). The CPU 15 subsequently sets the built-in timer at the predetermined time t1 and starts the counting by the timer (step S502).

The CPU 15 repeats the determination on whether or not the counting of the time t1 is finished until the timer counts the predetermined time t1 (step S503) and proceeds the process to step S504 when the counting is finished.

When having proceeded the process to step S504, the CPU 15 reads out the reference seal imprint data from the work RAM 19, overlaps the reference seal imprint data on the position of the target seal imprint data included in the image data of a target bill, etc. by the transparent overlapping process and has the display 14 display the result.

By the process of step S504, an image in such a condition that the reference seal imprint is overlapped on the seal imprint portion of the image of a target bill, etc. and the target seal imprint can be seen through the reference seal imprint (hereinafter referred to as "target transparent image") is displayed on the display 14. (see FIG. 18(b)).

The CPU 15 thereafter proceeds the process to step S505, sets the built-in timer at the predetermined time t2 and starts the counting by the timer. The CPU 15 repeats the determination on whether or not the counting of the time t2 is finished until the timer counts the predetermined time t2 (step S506) and proceeds the process to step S507 when the counting is finished.

When having proceeded the process to step S507, the CPU 15 deletes the reference seal imprint form the displayed contents of the display 14. That is, the CPU 15 changes the target transparent image being the displayed contents at the present time to the displayed contents by the process of step S501. The image of target bill, etc. is displayed again.

The CPU 15 then determines in step S508 whether or not an instruction to finish the process is inputted from the inputting apparatus 21 by an operator during the process of steps S501 to S507. At this time, when determining that the instruction to finish is inputted, the CPU 15 finishes the first seal imprint blinking process. On the contrary, when determining that the instruction to finish is not inputted, the CPU 15 returns the process to step S502.

By the above-mentioned process of steps S501 to S507, the image of target bill, etc. is displayed for the time t1 and the target transparent image is subsequently displayed for the time t2. Then, the loop process of steps S502 to S508 is repeatedly conducted so that the image of the target bill, etc. and the target transparent image are alternatively displayed on the display 14 with the time (t1+t2) as one cycle (see FIG. 18(c)).

Here, both of the time t1 and the time t2 are set as a subtle time. Therefore, the reference seal imprint seems to be blinking on the target seal imprint in the image of the target bill, etc. for an operator.

Incidentally, the time t1 and the time t2 can be set from the inputting apparatus 21 by an operator. Each data designating the set time t1 and time t2 is stored in the work RAM 19 and used at step S503 and step S506.

Figure 19:
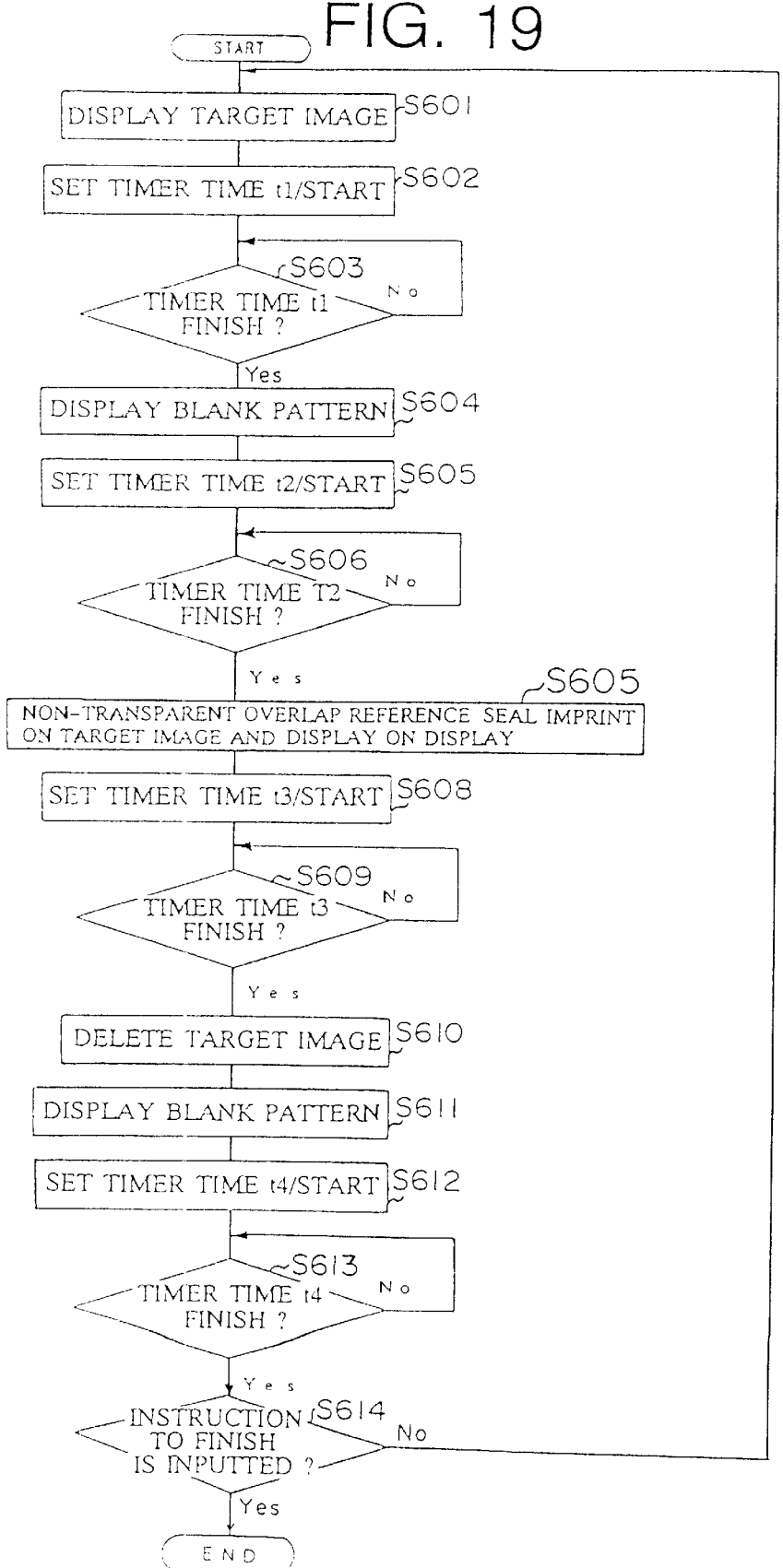
FIG. 19 is a flow chart showing a second seal imprint blinking process.

The second seal imprint blinking process using the above-mentioned transparent overlapping process is now described. FIG. 19 is a flow chart showing the first seal imprint blinking process and FIG. 20 is an explanatory illustration of the second seal imprint blinking process.

The second seal imprint blinking process is the process for alternatively displaying an image data of a bill, etc. including a target seal imprint and an image formed by overlapping the reference seal imprint on the image of the bill, etc. by the non-transparent overlapping process, and displaying the image data of a blank bill, etc. not including any seal imprint between these displays.

When the second seal imprint blinking process starts, the CPU 15 causes the display 14 to display the image of the target bill, etc. (see FIG. 20(a)) (step S601). The CPU 15 subsequently sets the built-in timer at the predetermined time t1 and starts the counting by the timer (step S602).

The CPU 15 repeats the determination on whether or not the counting of the time t1 is finished until the timer counts the predetermined time t1 (step S603) and proceeds the process to step S604 when the counting is finished.

When having proceeded the process to step S604, the CPU 15 deletes the target seal imprint data from the image data of target bill, etc. The image of the target seal imprint in the image of the target bill, etc. shown on the display 14 is deleted and the blank bill image (pattern of the bill, etc. without any seal imprint) is displayed.

The CPU 15 subsequently sets the built-in timer at the predetermined time t2 and starts the counting by the timer (step S605). The CPU 15 repeats the determination on whether or not the counting of the time t2 is finished until the timer counts the predetermined time t2 (step S606) and proceeds the process to step S607 when the counting is finished.

When having proceeded the process to step S607, the CPU 15 displays on the display 14 the reference seal imprint data overlapping the image data of the target bill, etc. by the non-transparent overlapping process. With this, the image of the reference seal imprint is displayed in the position where the target seal imprint in the image was placed (see FIG. 20(b)).

The CPU 15 subsequently sets the built-in timer at the predetermined time t3 and starts the counting by the timer (step S608). The CPU 15 repeats the determination on whether or not the counting of the time t3 is finished until the timer counts the predetermined time t3 (step S609) and proceeds the process to step S610 when the counting is finished.

When having proceeded the process to step S610, the CPU 15 deletes the target seal imprint image from the target bill image and displays the blank bill image in the same way as in step S604 (step S611).

The CPU 15 subsequently sets the built-in timer at the predetermined time t4 and starts the counting by the timer (step S612). The CPU 15 repeats the determination on whether or not the counting of the time t4 is finished until the timer counts the predetermined time t4 (step S613) and proceeds the process to step S614 when the counting is finished.

When having proceeded the process to step S614, the CPU 15 determines whether or not an instruction to finish the second seal imprint blinking process is inputted from the inputting apparatus 21 by an operator during the process of steps S601 to S613. At this time, when determining that the instruction to finish is inputted, the CPU 15 finishes the second seal imprint blinking process. On the contrary, when determining that the instruction to finish is not inputted, the CPU 15 returns the process to step S601.

By the above-mentioned process of steps S601 to S613, the image of target bill, etc. is displayed for the time t1, the image of the target bill, etc. with the target seal imprint deleted (the blank bill) is subsequently displayed for the time t2, the image of the bill, etc. with the reference seal imprint displayed in place of the target seal imprint is subsequently displayed for the time t3 and the image of the blank bill is subsequently displayed for the time t4.

The loop process of steps S601 to S614 is repeatedly conducted and thereby the target seal imprint and the reference seal imprint are alternatively displayed on the image of the bill, etc. displayed on the display 14 with the time (t1+t2+t3+t4) as one cycle with displaying the blank bill image between the times (see FIG. 20(*c*)). An operator can set the times t1 to t4 at will.

Incidentally, although the above-mentioned first seal imprint blinking process and the second seal imprint blinking process are meant to be executed after finishing the automatic verifying process in the present preferred embodiment, the first seal imprint blinking process and the second seal imprint blinking process may be set to be respectively executed by an operator's setting at will without conducting the automatic verifying process.

As described above, since the visual confirmation work using the seal imprint verifying apparatus 10 can be conducted using the image data of the reference bill, etc. read out from the seal imprint DB 13 and the image data of target bill, etc. acquired by the image reader 12, an actual object such as a bill is not required. Therefore, the confirmation work (verifying work by an operator) can be conducted more smoothly than in the past and the efficiency of the work can be attained.

[Signature seal verifying process]

Figure 21:
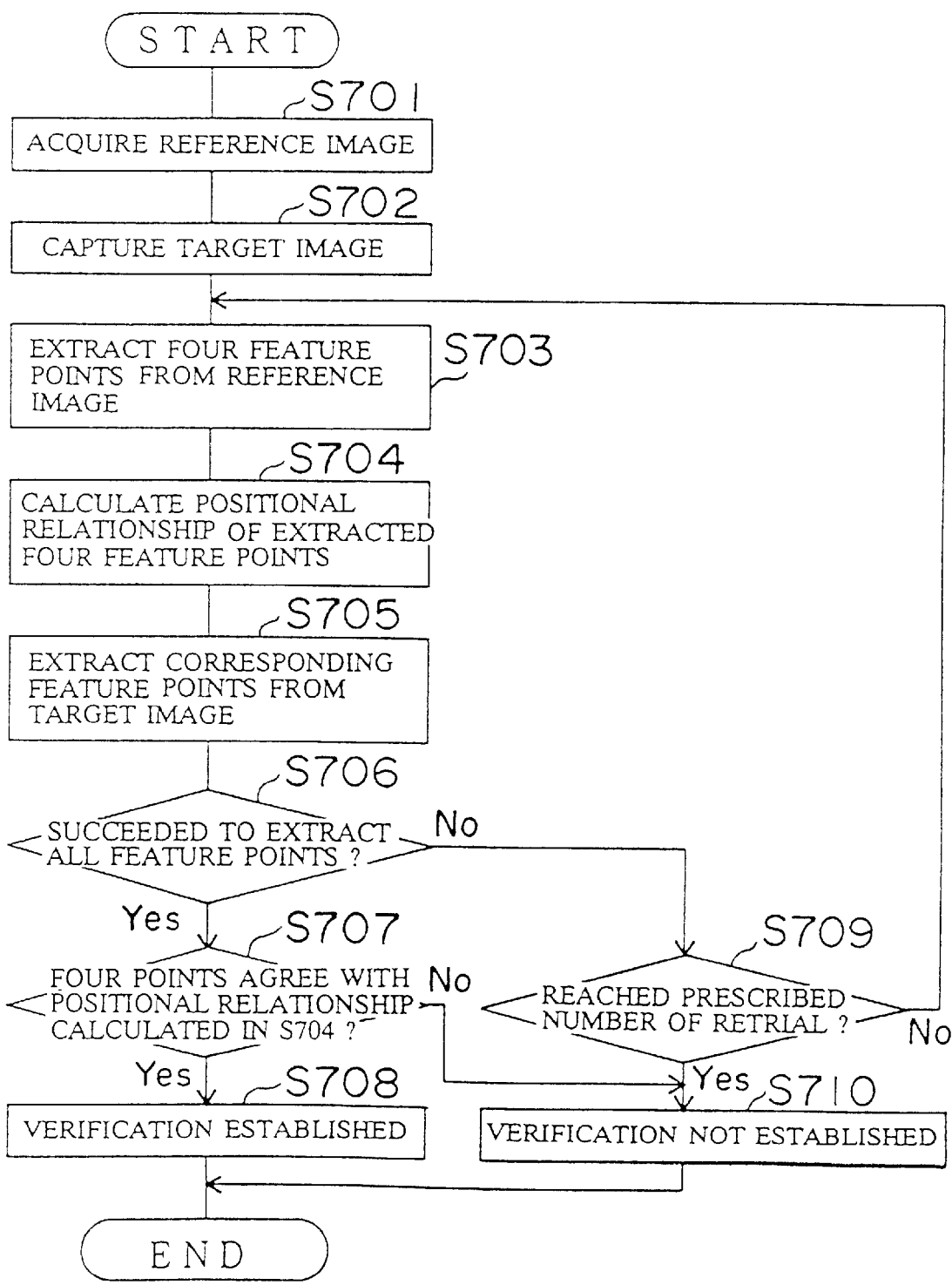
FIG. 21 is a flow chart showing a signature seal verifying process.

The process for verifying a signature seal stamped on a bill, etc. using the seal imprint verifying apparatus 10 is now described. FIG. 21 is a flow chart showing the signature seal verifying process and FIG. 22 is an explanatory illustration of the signature seal verifying process. The signature seal verifying process starts when a bill, etc. with a signature seal stamped is set in the image reader and an operator inputs an instruction to start the signature seal verifying process in the CPU 15 via the inputting apparatus 21.

In FIG. 21, when the signature seal verifying process starts, the CPU 15 acquires the image data of a reference bill, etc. (step S701). Thai is, the CPU 15 is in the condition to wait for the input of a retrieval key of the image data when the process of step S701 starts. When the retrieval key is inputted by an operator, the CPU 15 thereafter searches the DB 13 with the retrieval key and reads out the pertinent image data (see FIG. 22(*a*)). The CPU then stores the image data in the work RAM 19.

The CPU 15 subsequently acquires the image data of the target bill, etc. (step S702). That is, the CPU 15 gives an instruction to read the image data to the image reader controlling device 16 and cause the image reader 12 to read the image of the target bill, etc. The CPU 15 then captures the image data of the target bill, etc. from the image reader 12 via the image reader controlling device 16 and stores the image data in the work RAM 19.

The CPU 15 subsequently specifies the image data of the signature seal imprint from the image data of reference bill, etc. acquired in step S701 (see FIG. 22(*b*)) and extracts the four feature points in the reference signature seal imprint from the image data (step S704). For example, as shown in FIG. 22(*c*), when the signature seal imprint consists of the letters laid out in a rectangle, the CPU 15 considers the letter positioned in the upper left corner a first feature point, the letter positioned in the lower left corner a second feature point, the letter positioned in the upper right corner a third feature point and a part of the letter positioned in the lower right corner a fourth feature point and extracts the feature points, respectively.

The CPU 15 subsequently calculates the positional relationship of the four feature points extracted in step S704 (step S705). For example, as shown in FIG. 22(*d*), the CPU 15 calculates the distance x between the first feature point and the third feature point, the distance y between the first feature point and the fourth feature point and the distance z between the first feature point and the second feature point, respectively, with the position of the first feature point as a basis. The CPU 15 also calculates the angle α formed by the segment connecting the first feature point and the second feature point and the segment connecting the first feature point and the fourth feature point and the angle β formed by the segment connecting the first feature point and the fourth feature point and the segment connecting the first feature point and the third feature point, respectively.

The CPU 15 subsequently specifies the image data of the signature seal imprint from the image data of the target bill, etc. and extracts the feature points corresponding to the four feature points extracted in step S704 from the image data (Step S705). For example, in the example shown in FIG. 22, the feature points corresponding to the above-mentioned first to fourth feature points are extracted from the image data of the target signature seal imprint.

The CPU 15 subsequently determines whether or not all the feature points corresponding to the feature points extracted from the reference signature seal imprint in step S704 are extracted from the target signature seal imprint by the process of step S705 (step S706). At this time, when determining that all the feature points are extracted, the CPU 15 proceeds the process to step S707. On the contrary, when determining that all the feature points are not extracted, the CPU 15 proceeds the process to step S709.

In the example shown in FIG. 22, whether or not all the feature points corresponding to the first to fourth feature points are extracted from the image data of the target signature seal imprint is determined by the process of step S706. When all the feature points corresponding to the first to fourth feature points are extracted, the process then proceeds to step S707, and otherwise, the process proceeds to step S709.

When having proceeded the process to step S707, the CPU 15 determines whether or not the positional relationship of the four feature points of the target signature seal imprint extracted in step S705 agrees with the positional relationship of the four feature points calculated in step S704. At this time, when determining that both positional relationships agree with each other, the CPU 15 proceeds the process to step S708. On the contrary, when determining that both positional relationships do not agree with each other, the CPU 15 proceeds the process to step S710.

In the example shown in FIG. 22, whether or not the positional relationship of the four feature points extracted from the target signature seal imprint has the distance x, the distance y, the distance z, the angle α and the angle β is determined. When the positional relationship of the four feature points has the above-mentioned distance x, distance y, distance z, angle α and angle β, the process proceeds to step S708, and otherwise, the process proceeds to step S710.

When having proceeded the process to step S708, the CPU 15 displays on the display 14 that the reference signature seal imprint agrees with the target signature seal imprint (verification is established). The CPU 15 thereafter finishes the signature seal verifying process.

On the other hand, when having proceeded the process to step S709, the CPU 15 determines whether or not the extraction process of feature points has reached the prescribed number of retrial. At this time, when determining that the extraction process has reached the prescribed number of retrial, the CPU 15 then proceeds the process to step S710. On the contrary, when determining that the extraction process has not reached the prescribed number of retrial, the CPU 15 returns the process to step S703.

However, when having returned the process from step S709 to step S703, the CPU 15 extracts from the image data of the reference signature seal imprint the feature point extracted in the previous step S703 for the feature point corresponding to the feature point which could be extracted in step S705, and for the feature point corresponding to the feature point which could not be extracted in step S705, extracts the feature point different from the feature point extracted in the previous step S703. Further, when the process has returned from step S709 to step S703, the process may be constructed so that four feature points different from the four feature points extracted in the previous step S703 are extracted.

When having proceeded the process to step S710, the CPU 15 displays on the display 14 that the reference signature seal imprint does not agree with the target signature seal imprint (verification is not established). The CPU 15 thereafter finishes the signature seal imprint verifying process.

What is claimed is:

1. A seal imprint verifying apparatus for verifying whether or not a target seal imprint stamped on a target surface agrees with a reference seal imprint registered in advance, comprising:
   image data capturing means for capturing an image data of said target surface;
   color information extracting means for extracting an image data having color including at image data of said target surface;
   size information extracting means for respectively comparing a horizontal size and a vertical size of each of objects having a color equivalent to said target seal imprint included in the image data extracted by said color information extracting means with a horizontal size and a vertical size of said reference seal imprint, removing objects having the size differing from said reference seal imprint, and extracting a residual object as an image data of said target seal imprint recognized as having the size equivalent to said reference seal imprint; and
   determining means for comparing the image data of said reference seal imprint and the image data of said target seal imprint to determine whether or not both image data agree with each other.

2. The seal imprint verifying apparatus as claimed in claim 1, wherein said determining means changes the direction of either one of the image data of said reference seal imprint or the image data of said target seal imprint to detect the degree of difference for a plurality of times and, when the minimum value of the acquired plurality of degree of difference values is less than the threshold value, determines that said reference seal imprint agrees with said target seal imprint.

3. The seal imprint verifying apparatus as claimed in claim 1, comprising:
   mask image preparing means for preparing a mask image data showing the external shape of the image data of said target seal imprint, wherein the mask image preparing means is for verifying a partial seal imprint; and
   image data composing means for calculating the logical product of the image data of said reference seal imprint and said mask image data and preparing a composed reference image data based on the calculation result, wherein said determining means compares said composed reference image data and the image data of said target seal imprint to determine whether or not both image data agree with each other.

4. The seal imprint verifying apparatus as claimed in claim 3, wherein said determining means changes the direction of either one of said composed reference image data or of the image data of said target seal imprint to detect the degree of difference for a plurality of times and, when the minimum value of the acquired plurality of degree of difference values is less than the threshold value, determines that said target seal imprint agrees with said reference seal imprint.

5. The seal imprint verifying apparatus as claimed in claim 4, wherein said determining means changes the direction of the letters of said composed reference image data to detect the degree of difference and said image data composing means changes the direction of the letters of said reference seal imprint to prepare said composed reference image data each time the direction is changed by said determining means.

6. The seal imprint verifying apparatus as claimed in claim 1, comprising:
   external frame removing means for preparing an image data excluding the external frame portion of the seal imprint from said target seal imprint and preparing an image data excluding the external frame portion of the seal imprint from said reference seal imprint, wherein said determining means compares said reference seal imprint and said target seal imprint from which external frame portions are excluded by said external frame removing means to determine whether or not both seal imprints agree with each other.

7. A seal imprint verifying apparatus for verifying whether or not a target seal imprint stamped on a target surface agrees with a reference seal imprint registered in advance, comprising:
   image data capturing means for capturing an image data of said target surface;
   target specifying means for extracting an image data of said target seal imprint from the image data of said target surface, said target seal imprint having a partial external shape by inappropriate stamping;
   mask image preparing means for preparing a mask image data representing the external shape of the image data of said target seal imprint, wherein the mask image preparing means is for verifying a partial seal imprint;
   image data composing means for calculating the logical product of the image data of said reference seal imprint and said mask image data in order to prepare a composed reference image data, said composed reference image data being an image data of said reference seal imprint having external shape equivalent to a partial target seal imprint; and
   determining means for comparing said composed reference image data and the image data of said target seal imprint to determine whether said target seal imprint agrees with said reference seal imprint.

8. The seal imprint verifying apparatus as claimed in claim 7, wherein said determining means changes the direction of either one of said composed reference image data or of the image data of said target seal imprint to detect the degree of difference a plurality of times and, when the minimum value of the acquired plurality of degree of difference values is less than the threshold value, determines that said target seal imprint agrees with said target seal imprint.

9. The seal imprint verifying means as claimed in claim 8, wherein said determining means changes the direction of said composed reference image data to detect the degree of difference and said image data composing means prepares said composed reference image data each time the direction is changed by said determining means.

10. The seal imprint verifying apparatus as claimed in claim 7, comprising:

external frame removing means for preparing an image data excluding the external frame portion of the seal imprint from said target seal imprint and preparing an image data excluding the external frame portion of the seal imprint from said reference seal imprint, wherein said determining means compares said reference seal imprint and said target seal imprint from which external frame portions are excluded by said external frame removing means to determine whether or not both seal imprints agree with each other.

11. A seal imprint verifying apparatus for verifying whether or not a target seal imprint stamped on a target surface agrees with a reference seal imprint registered in advance, comprising:

image data capturing means for capturing an image data of said target surface;

target specifying means for extracting an image data of said target seal imprint from the image data of said target surface, said target imprint and said reference imprint respectively containing a letters portion and an external frame portion surrounding the letters portion;

external frame removing means for respectively removing the external portions from said target imprint and said reference imprint; and determining means for comparing said reference seal imprint and said target imprint from which the external frame portions are removed by said external frame removing means and determining whether or not both seal imprints agree with each other.

12. The seal imprint verifying apparatus as claimed in claim 11, comprising:

external diameter determining means for determining whether or not the external diameter of said target seal imprint and the external diameter of said reference seal imprint are recognized as agreeing with each other; and external shape determining means for determining whether or not the external shape of said target seal imprint and the external shape of said reference seal imprint are recognized as agreeing with each other; wherein said external frame removing means prepares an image data excluding the external frame of the seal imprint when it is determined that the external diameters and the external shapes are recognized as agreeing with each other by said external diameter determining means and said external shape determining means respectively.

13. The seal imprint verifying apparatus as claimed in claim 11, wherein said determining means changes the direction of either one of said reference seal imprint or said target seal imprint to detect the degree of difference a plurality of times and, when the minimum value of the acquired plurality of degree of difference values is less than the threshold value, determines that said target seal imprint agree with said target seal imprint.

14. The seal imprint verifying apparatus as claimed in claim 11, comprising:

mask image preparing means for preparing a mask image data showing the external shape of the image data of said target seal imprint; and image data composing means for calculating the logical product of the image data of said reference seal imprint and said mask image data and preparing a composed reference image data based on the calculation result, wherein said determining means compares said composed reference image data and the image data of said target seal imprint to determine whether or not both image data agree with each other.

15. The seal imprint verifying apparatus as claimed in claim 14, wherein said determining means changes the direction of either one of said composed reference image data or said target seal imprint to detect the degree of difference a plurality of times and, when the minimum value of the acquired plurality of degree of difference values is less than the threshold value, determines that said target seal imprint agree with said reference seal imprint.

16. The seal imprint verifying apparatus as claimed in claim 15, wherein said determining means changes the direction of said composed reference image data to detect the degree of difference and said image data composing means changes the direction of said reference seal imprint to prepare said composed reference image data each time the direction is changed by said determining means.

17. The seal imprint verifying apparatus as claimed in claim 7, wherein said target specifying means comprises:

color information extracting means for extracting an image data having the color of said target seal imprint from the image data of said target surface, and size information extracting means for extracting as an image data of said target seal imprint image data recognized to have the size equivalent to said reference seal imprint out of the image data extracted by said color information extracting means.

18. A seal imprint verifying apparatus for verifying whether or not a target seal imprint stamped on a target surface agrees with a reference seal imprint registered in advance, comprising:

image data capturing means for capturing an image data of said target surface, said target surface being represented said target imprint and the other objects:

target specifying means for extracting an image data of said target seal imprint out of the image data of said target surface;

overlapping means for preparing an overlapping image being overlapped by said reference seal imprint on said target seal imprint; and display controlling means for displaying said target surface, further, alternately and successively displaying said target imprint on said target surface and the overlapping image being displayed a position of said target imprint.

19. The seal imprint verifying apparatus as claimed in claim 18, wherein said overlapping means forms said overlapped image so that the image of said target seal imprint can be seen through the image of said reference seal imprint.

20. The seal imprint verifying apparatus as claimed in claim 18, wherein said display controlling means displays the image data of said seal imprint surface for a first period of time and displays said overlapped image data for a second period of time and thereby alternatively displays these image data, and the said first and the second periods of time can be set by an operator at will.

21. The seal imprint verifying apparatus as claimed in claim 18, wherein said overlapping means forms said overlapped image so that the image of said target seal imprint cannot be seen by being hidden behind the image of said reference seal imprint.

22. The seal imprint verifying apparatus as claimed in claim 18, wherein said display controlling means displays the image data of said target surface for a first period of time, displays said overlapped image data for a third period of time after a blank period for a second period of time, places a blank period for a fourth period of time and thereby alternatively displays these image data with the blank period in between, and said first, second, third and fourth periods of time can be set by an operator at will.

23. A seal imprint verifying apparatus for comparing a target seal imprint being a seal imprint of a signature seal stamped on a target surface and a reference seal imprint being a seal imprint of a signature seal registered in advance to determine whether or not both seal imprints agree with each other, comprising:

first extracting means for extracting a plurality of feature points from a circumference of said reference seal imprint based upon respective distances and angles between the feature points;

calculating means for calculating relative distances and relative angles of the plurality of feature points extracted by said first extracting means;

second extracting means for extracting from said target seal imprint, a feature point corresponding to each feature point extracted by said first extracting means respectively; and determining means for calculating the relative distances and the relative angles of a plurality of feature points extracted by said second extracting means when said second extracting means extracts all the feature points corresponding to said feature points, and, if the relative distances and the relative angles agrees with the positional relationship calculated by said calculating means, determines that said target seal imprint agrees with said reference seal imprint.

* * * * *

UNITED STATES PATENT AND TRADEMARK OFFICE
CERTIFICATE OF CORRECTION

PATENT NO. : 6,351,550 B1
DATED : February 26, 2002
INVENTOR(S) : Hideyuki Inaoka et al.

It is certified that error appears in the above-identified patent and that said Letters Patent is hereby corrected as shown below:

Column 21,
Line 40, after "at" insert -- at least one of red, green, blue and a combination of these said target seal imprint from the --

Column 26,
Line 13, after "and" start a new paragraph.

Signed and Sealed this

Twenty-second Day of July, 2003

JAMES E. ROGAN
*Director of the United States Patent and Trademark Office*